United States Patent
Cavalcanti et al.

(10) Patent No.: US 11,528,722 B2
(45) Date of Patent: Dec. 13, 2022

(54) APPARATUS, SYSTEM AND METHOD OF SCHEDULING TIME SENSITIVE NETWORKING (TSN) WIRELESS COMMUNICATIONS

(71) Applicant: INTEL CORPORATION, Santa Clara, CA (US)

(72) Inventors: Dave Cavalcanti, Beaverton, OR (US); Laurent Cariou, Portland, OR (US); Mohammad Mamunur Rashid, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 110 days.

(21) Appl. No.: 17/041,145

(22) PCT Filed: Sep. 26, 2018

(86) PCT No.: PCT/US2018/052827
§ 371 (c)(1),
(2) Date: Sep. 24, 2020

(87) PCT Pub. No.: WO2020/013874
PCT Pub. Date: Jan. 16, 2020

(65) Prior Publication Data
US 2021/0022154 A1 Jan. 21, 2021

Related U.S. Application Data

(60) Provisional application No. 62/695,084, filed on Jul. 8, 2018.

(51) Int. Cl.
*H04W 72/12* (2009.01)
*H04W 28/24* (2009.01)
(Continued)

(52) U.S. Cl.
CPC ....... *H04W 72/1205* (2013.01); *H04W 28/24* (2013.01); *H04W 72/005* (2013.01); *H04W 72/0446* (2013.01)

(58) Field of Classification Search
CPC ............ H04W 72/1205; H04W 28/24; H04W 72/005; H04W 72/0446; H04W 52/0216;
(Continued)

(56) References Cited

U.S. PATENT DOCUMENTS

| 9,331,962 B2 | 5/2016 | Lida et al. |
| 2014/0133376 A1* | 5/2014 | Ghosh ............... H04W 52/0216 370/311 |

(Continued)

OTHER PUBLICATIONS

IEEE Std 802.11™—2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.
(Continued)

*Primary Examiner* — Gregory B Sefcheck
*Assistant Examiner* — Joshua Smith
(74) *Attorney, Agent, or Firm* — Shichrur & Co.

(57) ABSTRACT

Some demonstrative embodiments may include apparatus, system and method of scheduling Time Sensitive Networking (TSN) wireless communications. For example, an apparatus may include logic and circuitry configured to cause a wireless communication Access Point (AP) to allocate at least one Time Sensitive Networking (TSN) enabled (TSN-enabled) Target Wakeup Time (TWT) Service Period (SP) based on one or more timing requirements of a TSN schedule of at least one TSN stream for at least one wireless communication station (STA); to transmit a TWT scheduling message to schedule the TSN-enabled TWT SP, the TWT scheduling message including an indication that the TSN-
(Continued)

enabled TWT SP is restricted to only TSN communications; and, during the TSN-enabled TWT SP, to communicate one or more frames of the at least one TSN stream with the at least one STA.

23 Claims, 12 Drawing Sheets

(51) Int. Cl.
 *H04W 72/00* (2009.01)
 *H04W 72/04* (2009.01)

(58) Field of Classification Search
 CPC . H04W 28/16; H04W 52/0229; H04W 74/08; H04W 74/04; H04W 72/1284; H04W 72/1289; H04W 84/12; H04W 74/006; H04W 72/12; H04W 28/18; Y02D 30/70
 See application file for complete search history.

(56) References Cited

U.S. PATENT DOCUMENTS

| | | | |
|---|---|---|---|
| 2017/0055290 A1* | 2/2017 | Lv | H04W 74/0816 |
| 2017/0280388 A1* | 9/2017 | Asterjadhi | H04W 72/1284 |
| 2018/0184438 A1 | 6/2018 | Cavalcanti et al. | |
| 2018/0227917 A1* | 8/2018 | Li | H04W 72/042 |
| 2018/0295573 A1* | 10/2018 | Gidvani | H04W 52/0229 |
| 2019/0253972 A1* | 8/2019 | Park | H04W 52/0235 |
| 2019/0268850 A1* | 8/2019 | Kim | H04W 52/0235 |
| 2019/0306790 A1* | 10/2019 | Kottontavida | H04W 72/1252 |

OTHER PUBLICATIONS

IEEE Std 802.1Qbv™—2015—IEEE Standard for Local and metropolitan area networks—Bridges and Bridged Networks Amendment 25: Enhancements for Scheduled Traffic, Dec. 5, 2015, 57 pages.
IEEE P802.11ax/D2.3 Draft Standard for Information technology—Tele-communications and information exchange between systems Local and metropolitan area networks—Specific requirements, Part 11: Wireless LAN Medium Access Control (MAC) and Physical Layer (PHY) Specifications, Amendment 6: Enhancements for High Efficiency WLAN, Apr. 2018, 660 pages.
Eric Gardiner et al., Avnu Alliance™ Best Practices, Theory of Operation for TSN-enabled Systems Applied to Industrial Markets, Revision 1.0, Feb. 28, 2017, 72 pages.
Stephen F Bush, AVnu Alliance® White Paper, Industrial Wireless Time-sensitive Networking Roadmap, Version 0.2—Sep. 8, 2017, 6 pages.
International Search Report and the Written Opinion for International Application No. PCT/US2018/052827, dated Mar. 25, 2019, 10 pages.
Matthew Fischer, 'CR TWT IE', doc.: IEEE 802.11-17/0777r8, Sep. 7, 2017, 34 pages.
Alfred Asterjadhi et al., 'TWT Information frames in 11ax', doc.: IEEE 802.11-16/1420r0, Nov. 2016, 12 pages.
Stephen F. Bush et al., 'Industrial Wireless Time-Sensitive Networking: RFC on the Path Forward', Jan. 5, 2018 https://avnu.org/wp-content/uploads/2014/05/Industrial-Wireless-TSN-Roadmapv1.0.3.pdf), 12 pages.
International Preliminary Report on Patentability for International Application No. PCT/US2018/052827, dated Jan. 21, 2021, 7 pages.

* cited by examiner

APPARATUS, SYSTEM AND METHOD OF SCHEDULING TIME SENSITIVE NETWORKING (TSN) WIRELESS COMMUNICATIONS

CROSS REFERENCE

This application claims the benefit of and priority from U.S. Provisional Patent Application No. 62/695,084 entitled "APPARATUS, SYSTEM AND METHOD OF SCHEDULING TIME SENSITIVE NETWORKING (TSN) WIRELESS COMMUNICATIONS", filed Jul. 8, 2018, the entire disclosure of which is incorporated herein by reference.

TECHNICAL FIELD

Embodiments described herein generally relate to scheduling Time Sensitive Networking (TSN) wireless communications.

BACKGROUND

Emerging applications for wireless communications, such as industrial control applications, autonomous systems, gaming, and/or virtual reality applications, demand tighter control of latency with higher reliability, for example, compared to throughput-centric applications.

An AVnu Alliance® White Paper, "Industrial Wireless Time-sensitive Networking Roadmap", Version 0.2, Sep. 8, 2017, describes a need to develop technical solutions to support wireless Time Sensitive Networking (TSN).

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
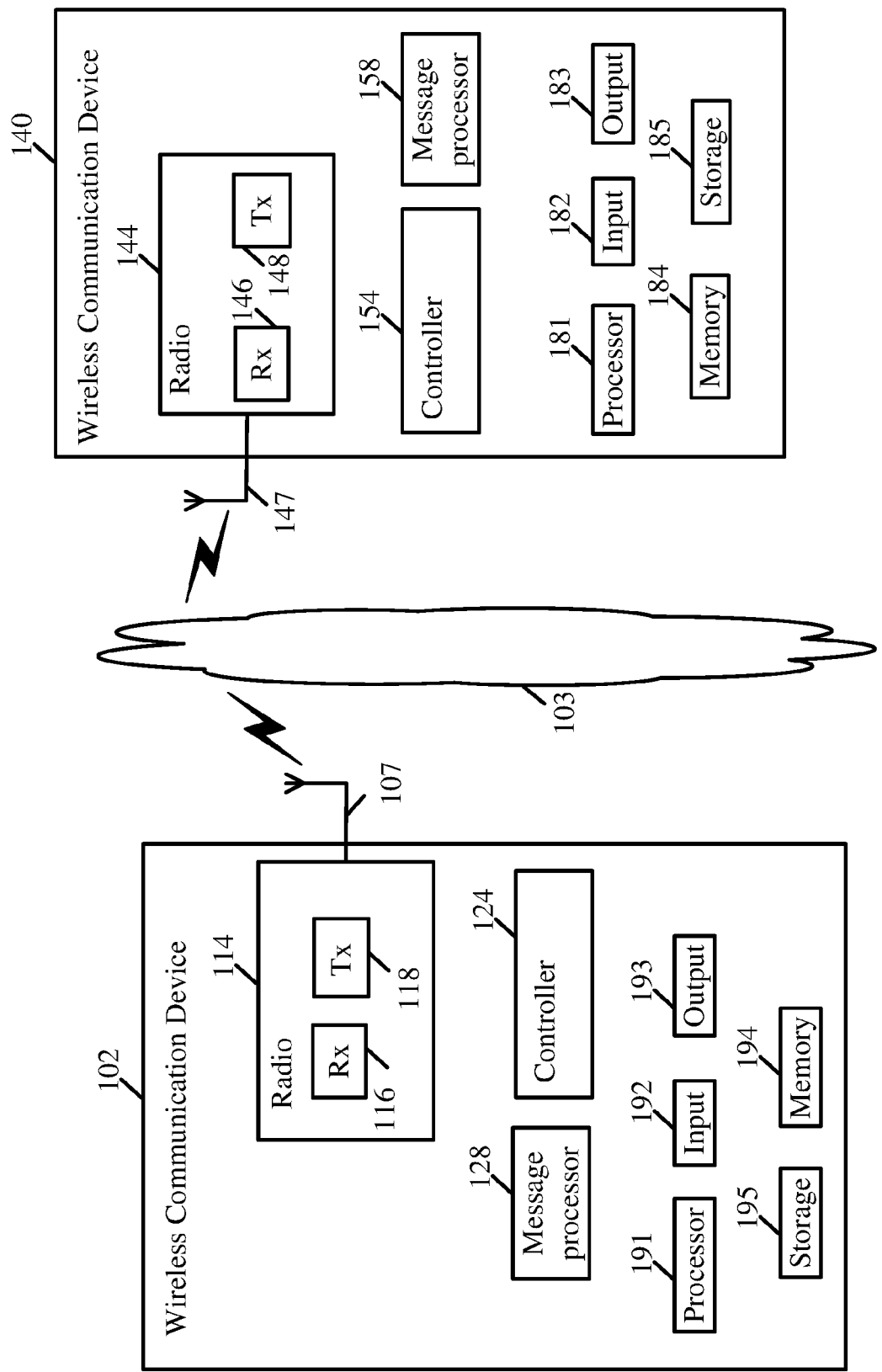
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (*IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016*); IEEE 802.11ax (IEEE 802.11ax-IEEE Draft Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications Amendment Enhancements for High Efficiency WLAN); and/or IEEE 802.11ay (*IEEE 802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz*)) and/or future versions and/or derivatives thereof, devices and/or networks operating in accordance with IEEE 802.1 standards (including *IEEE 802.1Qbv-2015-standard for Local and Metropolitan Area Networks-Media Access Control (MAC) Bridges and Virtual Bridged Local Area Networks Amendment: Enhancements for Scheduled Traffic*), devices and/or networks operating in accordance with existing WFA Peer-to-Peer (P2P) specifications (*WiFi P2P technical specification, version 1.7, Jul. 6, 2016*) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification Version 1.1, April 2011, Final specification*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz, or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Some demonstrative embodiments are described herein with respect to WiFi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication device 102 and/or wireless communication device 140.

In some demonstrative embodiments, wireless communication devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102 and/or 140 may include, operate as, and/or perform the functionality of one or more STAs. For example, device 102 may include at least one STA, and/or device 140 may include at least one STA.

In some demonstrative embodiments, devices 102 and/or 140 may include, operate as, and/or perform the functionality of one or more WLAN STAs.

In some demonstrative embodiments, devices 102 and/or 140 may include, operate as, and/or perform the functionality of one or more Wi-Fi STAs.

In some demonstrative embodiments, devices 102 and/or 140 may include, operate as, and/or perform the functionality of one or more BT devices.

In some demonstrative embodiments, devices 102 and/or 140 may include, operate as, and/or perform the functionality of one or more Neighbor Awareness Networking (NAN) STAs.

In some demonstrative embodiments, at least one of wireless communication devices 102 and/or 140, e.g., device 102, may include, operate as, and/or perform the functionality of an AP STA, and/or one or more of wireless communication devices 102 and/or 140, e.g., device 140, may include, operate as, and/or perform the functionality of a non-AP STA. In other embodiments, devices 102 and/or 140 may operate as and/or perform the functionality of any other STA.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a WiFi channel, an IR channel, a Bluetooth (BT) channel, and the like.

In some demonstrative embodiments, wireless communication medium 103 may include a wireless communication channel over a 2.4 Gigahertz (GHz) frequency band, or a 5 GHz frequency band, a millimeterWave (mmWave) frequency band, e.g., a 60 GHz frequency band, a Sub-1 GHz (S1G) band, and/or any other frequency band.

In some demonstrative embodiments, devices 102 and/or 140 may include one or more radios including circuitry and/or logic to perform wireless communication between devices 102 and/or 140 and/or one or more other wireless communication devices. For example, device 102 may include at least one radio 114, and/or device 140 may include at least one radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114, and/or radio 144, transmitters 118, and/or 148, and/or receivers 116, and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114, and/or radio 144 may include or may be implemented as part of a wireless Network Interface Card (NIC), and the like.

In some demonstrative embodiments, radios 114 and/or 144 may be configured to communicate over a 2.4 GHz band, a 5 GHz band, an mmWave band, a S1G band, and/or any other band.

In some demonstrative embodiments, radios 114 and/or 144 may include, or may be associated with, one or more antennas 107, and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, Antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102 may include a controller 124, and/or device 140 may include a controller 154. Controller 124 may be configured to perform and/or to trigger, cause, instruct and/or control device 102 to perform one or more communications, to generate and/or communicate one or more messages and/or transmissions, and/or to perform one or more functionalities, operations and/or procedures between devices 102, 140, and/or one or more other devices; and/or controller 154 may be configured to perform and/or to trigger, cause, instruct and/or control device 140 to perform one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, at least part of the functionality of controller 124 may be implemented as part of one or more elements of radio 114, and/or at least part of the functionality of controller 154 may be implemented as part of one or more elements of radio 144.

In other embodiments, the functionality of controller 124 may be implemented as part of any other element of device 102, and/or the functionality of controller 154 may be implemented as part of any other element of device 140.

In some demonstrative embodiments, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 128 may be configured to perform any other additional or alternative functionality and/or may include any other additional or alternative components to generate and/or process a message to be transmitted.

In some demonstrative embodiments, device 140 may include a message processor 158 configured to generate, process and/or access one or more messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 158 may be configured to perform any other additional or alternative functionality and/or may include any other additional or alternative components to generate and/or process a message to be transmitted.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a SoC. In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, wireless communication devices 102 and/or 140 may form, or may communicate as part of, a wireless local area network (WLAN).

In some demonstrative embodiments, wireless communication devices 102 and/or 140 may form, or may communicate as part of, a WiFi network.

In other embodiments, wireless communication devices 102 and/or 140 may form, and/or communicate as part of, any other additional or alternative network.

In some demonstrative embodiments, device 102 and/or device 140 may be configured to operate in accordance with one or more Specifications, for example, including one or more IEEE 802.11 Specifications, e.g., an IEEE 802.11-2016 Specification, an IEEE 802.11ax Specification, and/or any other specification and/or protocol.

In some demonstrative embodiments, device 102 and/or device 140 may be configured to support emerging applications for wireless communications, such as industrial control applications, autonomous systems, gaming, virtual reality applications, and/or any other additional or alternative applications and/or technologies, which may demand increased and/or tighter control of latency, e.g., with increase and/or higher reliability, for example, compared to throughput-centric applications.

In one example, it may be of interest to be able to utilize for such applications one or more available wireless technologies, such as, for example, IEEE 802.11/Wi-Fi technologies and/or any other wireless communication technologies. However, existing and upcoming IEEE 802.11 standards do not yet support capabilities required for enabling such applications. For example, there may be one or more requirements and/or technical gaps, which may need to be addressed, for example, to enable support of Time Sensitive Networking (TSN) over wireless communication networks.

For example, some TSN Standards, for example, IEEE 802.1 TSN Standards may be developed to enable time synchronization, guarantee latency and/or high reliability, e.g., primarily over wired/Ethernet links, for example, through bandwidth reservation, time-aware scheduling and/or redundancy techniques.

In some demonstrative embodiments, device 102 and/or device 140 may be configured to support one or more aspects for time synchronization for TSN, for example, as an enhancement for one or more wireless communication standards, for example one or more WiFi and/or IEEE 802.11 Standards. In one example, one or more TSN concepts may be supported as one or more enhancements to an IEEE 802.11ax Specification, and/or any other wireless Specification and/or Protocol.

In some demonstrative embodiments, devices 102 and/or 140 may be configured to support TSN wireless communication, for example, in a TSN network, e.g., as described below.

Figure 2:
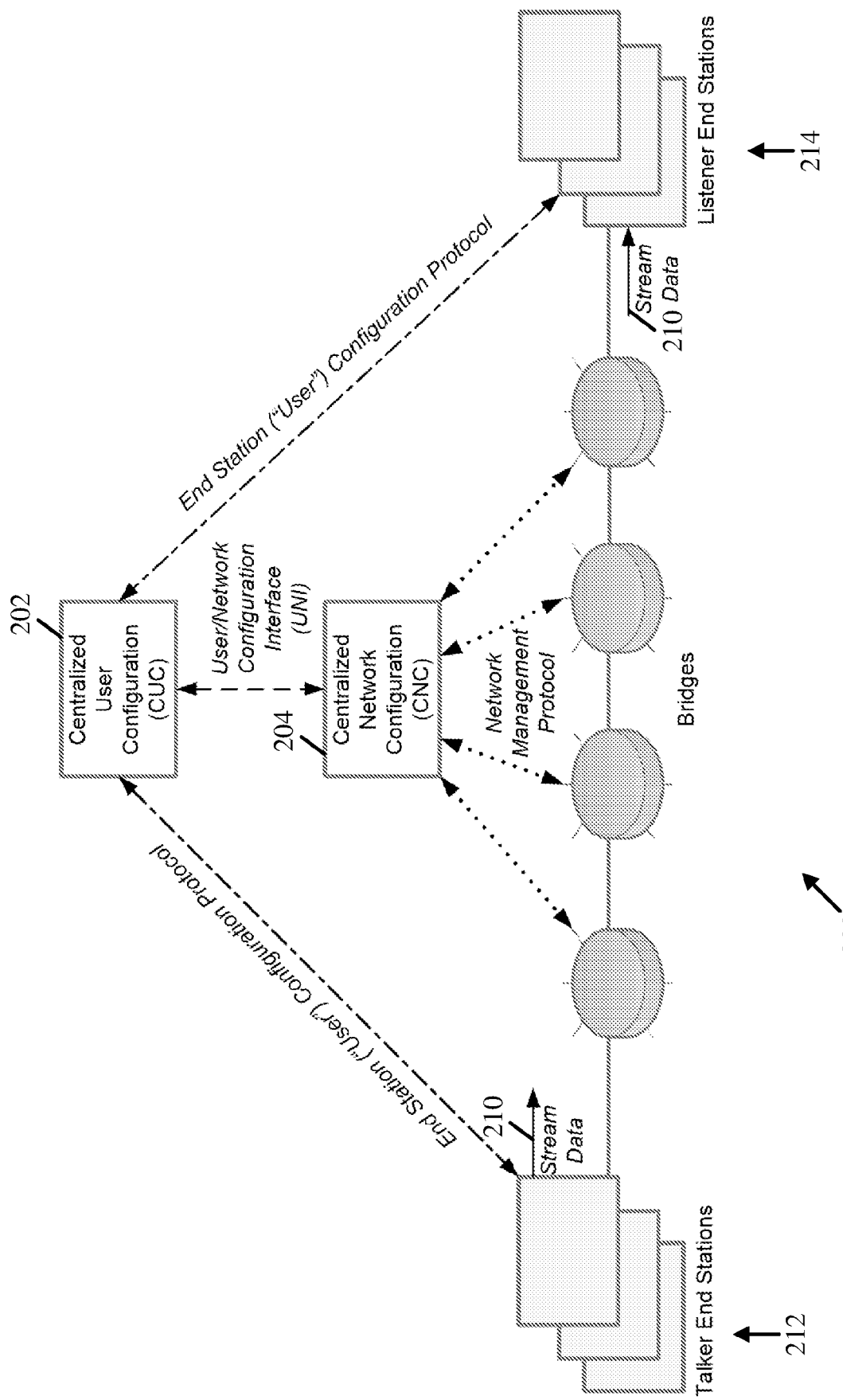
FIG. 2 is a schematic illustration of a Time Sensitive Networking (TSN) network including one or more elements, which may be implemented in accordance with some demonstrative embodiments.

Reference is made to FIG. 2, which schematically illustrates a Time Sensitive Networking (TSN) network 200 including one or more elements, which may be implemented in accordance with some demonstrative embodiments.

In some demonstrative embodiments, TSN network 200 may include one or more elements of a wireless communication network, for example, an 802.11 network in accordance with an IEEE 802.11 Specification and/or any other wireless network, which may be managed, for example, fully managed, according to a TSN management model, for example, an 802.1Qcc management model in accordance with an IEEE 802.1 Specification and/or any other management model.

In some demonstrative embodiments, TSN network 200 may be managed, for example, by an entity, e.g., a single entity, which may, for example, plan the deployment and/or resolve potential interference between Overlapping Basic Service Set (OBSS) at the planning and configuration stages.

In some demonstrative embodiments, one or more devices of TSN network 200 may be allowed to implement a minimal set of required features to operate under a managed network model, which includes, for example, a Central User Configuration (CUC) entity 202, which may be configured to collect information about TSN traffic streams 210; and/or a Centralized Network Configuration (CNC) entity 204, which may be configured to use the information about the TSN traffic streams 210, for example, to perform admission control, and/or to define and/or deploy resource allocation strategies, for example, to meet the required time sensitive performance. In one example, any suitable configuration and/or management protocols and/or mechanisms may be utilized, e.g., to meet the required time sensitive performance.

In some demonstrative embodiments, as shown in FIG. 2, for example, one or more STAs, e.g., one or more talker stations 212 and/or one or more listener stations 214, may be configured to represent TSN streams, for example, using one or more Quality of Service (QoS) parameters, for example, with one or more IEEE 802.11 QoS parameters, e.g., as part of Traffic Specification (TSPEC) information, and/or any other type of QoS parameters and/or any other parameters corresponding to, representing, and/or defining, the TSN streams.

In some demonstrative embodiments, as shown in FIG. 2, for example, a central entity, e.g., CUC entity 202 and/or CNC entity 204, for example, an AP, may be configured to perform admission control, for example, based at least on one or more initial TSN stream set up requests from one or more STAs.

In some demonstrative embodiments, for example, device 102 (FIG. 1) may be configured to perform one or more operations of, a role of, and/or one or more functionalities of, the central entity e.g., CUC entity 202 and/or CNC entity 204, and/or an AP of TSN network 200.

In some demonstrative embodiments, for example, device 140 (FIG. 1) may be configured to perform one or more operations of, a role of, and/or one or more functionalities of, a STA of the one or more STAs of TSN network 200, e.g., the one or more talker stations 212 and/or the one or more listener stations 214.

In some demonstrative embodiments, a central entity, e.g., CNC 204, may be responsible for defining a time aware schedule, for example, an 802.1Qbv time-aware schedule in accordance with an IEEE 802.1 Qbv Specification, for example, for all devices and/or entities in TSN network 200.

In some demonstrative embodiments, for example, all devices and/or entities in TSN network 200 may be synchronized to a same reference clock, e.g., a master clock.

In some demonstrative embodiments, for example, an AP and one or more STAs, e.g., a Wi-Fi AP and Wi-Fi STAs, for example, devices 102 and/or 140 (FIG. 1), may be configured to achieve synchronization over the air, for example, though a Basic Service Set (BSS) Timing Synchronization Function (TSF), a Timing Measurement, a Fine Timing Measurement, and/or any other additional or alternative time synchronization capabilities.

Some demonstrative embodiments may be implemented, for example, at least to address a technical problem of identifying a TSN stream and/or mapping a time aware schedule of the TSN stream, e.g., a 802.1Qbv time-aware schedule in accordance with an IEEE 802.1Qbv Specification, to a wireless channel access time, for example, an 802.11 channel access time, e.g., an 802.11ax MAC layer channel access time, for example, in order to meet one or more bounded latency requirements, e.g., as described below.

In one example, a centrally managed schedule, e.g., a TSN schedule, for example, in accordance with the IEEE 802.1Qbv-2015 Standard, may be deployed across all devices in a TSN network.

For example, the schedule may specify transmission times for one or more TSN queues, e.g., each TSN queue in a device, for example, in the form of a list of time synchronized gate open and gate close events.

In some demonstrative embodiments, devices 102 and/or 140 may be configured to implement one or more technical mechanisms, which may be configured to allow extending a schedule, for example, the 802.1Qbv schedule and/or any other TSN schedule, to a wireless network, for example, an 802.11 network, e.g., as described below.

In some demonstrative embodiments, devices 102 and/or 140 may be configured to implement one or more technical mechanisms to allow solving at least a technical problem of a wireless communication access mechanism, e.g., an 802.11 channel access mechanism, which may operate independently of higher layers, and accordingly, may add non-deterministic access delays to the frame transmission, in a way, which may not allow to benefit from the 802.1Qbv time-aware scheduling over a wireless link, e.g., as described below.

In some demonstrative embodiments, devices 102 and/or 140 may be configured to implement one or more technical mechanisms, which may be configured to support ensuring that TSN application packets may be identified as belonging to a TSN stream and/or mapped to actual over the air transmission times, for example, at an 802.11 MAC layer, e.g., as described below.

In some demonstrative embodiments, devices 102 and/or 140 may be configured to implement one or more technical mechanisms, which may be configured to align a time-aware schedule, for example, an 802.1Qbv time-aware schedule, with a wireless communication channel access schedule, e.g., 802.11 MAC channel access times, as described below. There is currently no standard mechanism to align an 802.1Qbv time-aware schedule with 802.11 MAC channel access times.

Figure 3:
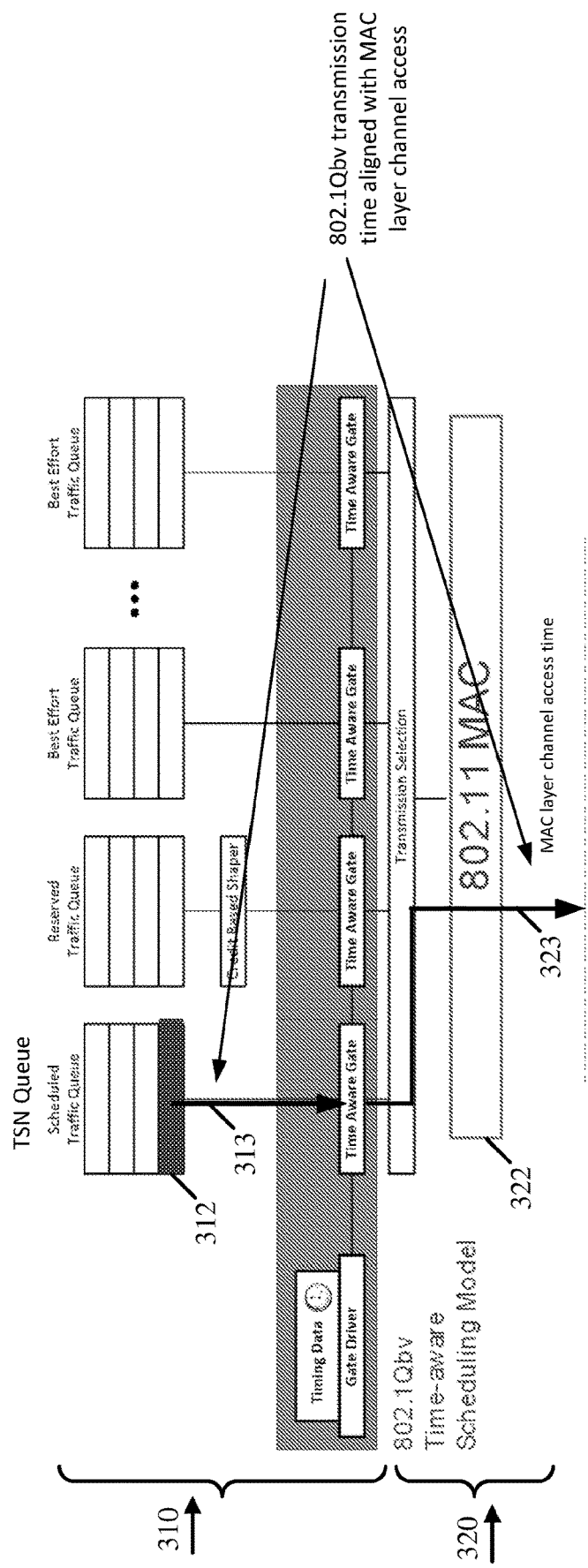
FIG. 3 is a schematic illustration of an alignment scheme to align between a TSN scheme and a wireless transmission scheme, in accordance with some demonstrative embodiments.

Reference is made to FIG. 3, which schematically illustrates an alignment scheme 300, in accordance with some demonstrative embodiments.

In one example, alignment scheme 300 may align between a TSN scheme 310 and a wireless transmission scheme 320, in accordance with some demonstrative embodiments.

In some demonstrative embodiments, for example, as shown in FIG. 3, a MAC layer 322, e.g., an 802.11 MAC, may be configured to align a MAC channel access 323 for wireless communication with a TSN scheduling 313 of a TSN stream 312, for example, an 802.11Qbv transmission time.

In some demonstrative embodiments, as shown in FIG. 3, there may be a need to align MAC channel access 323 and TSN scheduling 313, for example, to address a channel access latency of MAC layer 322.

In some demonstrative embodiments, devices 102 and/or 140 (FIG. 1) may be configured to implement one or more technical mechanisms, which may be configured to reduce the MAC channel access latency and/or to align the MAC channel access with the 802.1Qbv schedule, for example, as much as possible, e.g., as described below.

Referring back to FIG. 1, in some demonstrative embodiments, devices 102 and/or 140 may be configured to utilize a Target Wakeup Time (TWT) mechanism, e.g., in accordance with an IEEE 802.11ax Specification, for example, for scheduling TSN streams, which may be aligned with 802.1Qbv schedule times, e.g., as described below.

In some demonstrative embodiments, a TSN stream may be identified, for example, by a User Priority (UP) field, e.g., an 802.1Q UP field, which may include both a VLAN ID (VID) and a Priority Code Point (PCP), e.g. as describe below.

In other embodiments, any other additional or alternative mechanisms and/or parameters may be implemented to identify a TSN stream.

In some demonstrative embodiments, for example, the UP field may be utilized, for example, to map TSN data to TWT (also referred to as "TSN-enabled TWT"), which may be configured to be used, for example, only for TSN data, e.g., as described below.

In some demonstrative embodiments, for example, a TWT wake interval for a TSN-enabled TWT shall be set, for example, according to one or more TSN scheduling parameters of the TSN stream, for example, according to one or more 802.1Qbv gate open times for the specific TSN stream at the particular device, for example, an AP or a STA, e.g., as described below.

In some demonstrative embodiments, devices 102 and/or 140 may be configured to extend a mechanism, which may be configured to control contention, for example, a TWT mechanism, e.g., in accordance with the IEEE 802.11ax Specification and/or any other mechanism, for scheduling wireless communication of TSN streams, for example, with time-aware scheduling, e.g., in accordance with one or more 802.1 TSN standards, for example, 802.1Qbv, e.g., as described below.

In some demonstrative embodiments, devices 102 and/or 140 may be configured to implement a mechanism, for example, as an extension to an 802.11ax protocol, to enable an AP, e.g., device 102, to schedule TWTs, for example, aligned with one or more TSN traffic requirements and/or standards, e.g., as described below.

In some demonstrative embodiments, devices 102 and/or 140 may be configured to schedule, define, advertize, signal, indicate and/or communicate during, a TSN-enabled TWT, which may include a TWT during which a specific STA or group of STAs are only allowed to transmit or receive TSN data, e.g., as described below.

In some demonstrative embodiments, device 102 may be configured to schedule, allocate, and/or advertise a TSN enabled TWT, and/or device 140 may be configured to communicate TSN data with device 102, for example, during the TSN enabled TWT, e.g., as described below.

In some demonstrative embodiments, controller 124 may be configured to cause, trigger, and/or control the wireless communication station implemented by device 102 to allocate at least one TSN enabled TWT Service Period (SP) based on one or more timing requirements of a TSN schedule of at least one TSN stream for at least one STA, for example, device 140, e.g., as described below.

In some demonstrative embodiments, controller 124 may be configured to cause, trigger, and/or control the wireless communication station implemented by device 102 to transmit a TWT scheduling message to schedule the TSN-enabled TWT SP, e.g., as described below.

In some demonstrative embodiments, the TWT scheduling message may include an indication that the TSN-enabled TWT SP is restricted to only TSN communications, e.g., as described below.

In some demonstrative embodiments, device 140 may receive the TWT scheduling message from device 102, e.g., as described below.

In some demonstrative embodiments, controller 154 may be configured to cause, trigger, and/or control the wireless communication station implemented by device 140 to receive from an AP, e.g., device 102, the TWT scheduling message to schedule the TSN-enabled TWT SP including the indication that the TSN-enabled TWT SP is restricted to only TSN communications. The TSN-enabled TWT SP may be based on the one or more timing requirements of the TSN schedule of the at least one TSN stream for device 140, e.g., as described below.

In some demonstrative embodiments, devices 102 and/or 140 may communicate one or more frames of the at least one TSN stream, e.g., during the TSN-enabled TWT SP, e.g., as described below.

In some demonstrative embodiments, controller 124 may be configured to cause, trigger, and/or control the wireless communication station implemented by device 102 to, during the TSN-enabled TWT SP, communicate one or more frames of the at least one TSN stream with device 140, e.g., as described below.

In some demonstrative embodiments, controller 154 may be configured to cause, trigger, and/or control the wireless communication station implemented by device 140 to, during the TSN-enabled TWT SP, communicate one or more frames of the at least one TSN stream with device 102, e.g., as described below.

In some demonstrative embodiments, the TSN schedule may include one or more transmission windows for the at least one TSN stream, e.g., as described below.

In some demonstrative embodiments, at least one TSN-enabled TWT SP may be based on the one or more transmission windows, e.g., as described below.

In some demonstrative embodiments, controller 124 may be configured to cause, trigger, and/or control the wireless communication station implemented by device 102 to allocate the at least one TSN-enabled TWT SP based on the one or more transmission windows, e.g., as described below.

In some demonstrative embodiments, the at least one TSN-enabled TWT SP may be according to one or more gate open times for device 140, for example, in the TSN schedule, e.g., as described below.

In some demonstrative embodiments, controller 124 may be configured to cause, trigger, and/or control the wireless communication station implemented by device 102 to allocate the at least one TSN-enabled TWT SP, for example, according to one or more gate open times for device 140 in the TSN schedule, e.g., as described below.

In some demonstrative embodiments, the TSN schedule may include an 802.1Qbv schedule, e.g., in accordance with an IEEE 802.11Qbv Specification. In other embodiments, the TSN schedule may include any other schedule.

In some demonstrative embodiments, a start time of the at least one TSN-enabled TWT SP may be according to the one or more gate open times, which may be defined, for example, by the 802.1Qbv schedule, e.g., as described below.

In some demonstrative embodiments, controller 124 may be configured to cause, trigger, and/or control the wireless communication station implemented by device 102 to allocate the start time of the at least one TSN-enabled TWT SP according to the one or more gate open times, e.g., as described below.

In one example, the AP, e.g., device 102, may configure one or more start times for the TSN-enabled TWT service periods, for example, according to, e.g., possibly aligned with, one or more 802.1Qbv gate open times for the corresponding STAs, e.g., including device 140. This may ensure, for example, minimal access delay between the 802.1Qbv schedule and the actual wireless channel access.

In some demonstrative embodiments, a TSN-enabled TWT may be defined, for example, as one or more individual TWT(s) ("STA-specific TWT"). For example, the TSN-enabled TWT may be an individual TWT(s), which may be, for example, negotiated by an AP and one or more STAs, and during which only TSN data can be transmitted.

In some demonstrative embodiments, there may be one or more requirements defined for TSN-enabled Individual (STA-specific TWT) Service Periods (STA-specific TSN-enabled TWT SP).

For example, in order to enable TSN grade QoS, it is expected that all STA will support TWT operation. However, since STAs are not required to be aware of TWTs negotiated by other STAs in the network, it may be the responsibility of an AP to schedule TWTs for all STAs, for example, to avoid overlapping and/or to protect the TSN-enabled TWTs.

In one example, an AP may set up multiple non-overlapping TSN-enabled TWTs and assign them, for example, to one or more groups of TSN STAs.

In other embodiments, the TSN-enabled Individual TWT Service Periods may be defined and/or assigned according to any other additional or alternative requirements and/or criteria.

In some demonstrative embodiments, device 102 may allocate a STA-specific TSN-enabled TWT SP to at least one specific STA, e.g., to device 140, e.g., as described below.

In some demonstrative embodiments, controller 124 may be configured to cause, trigger, and/or control the wireless communication station implemented by device 102 to allocate a STA-specific TSN-enabled TWT SP to device 140, e.g., as described below.

In some demonstrative embodiments, controller 124 may be configured to cause, trigger, and/or control the wireless communication station implemented by device 102 to transmit a STA-specific TWT scheduling message to indicate that the STA-specific TSN-enabled TWT SP is restricted to communication of TSN frames at least of device 140, e.g., as described below.

In some demonstrative embodiments, the STA-specific TWT scheduling message may include a TWT Identifier (ID) field to map the STA-specific TWT SP to a TSN stream, e.g., as described below.

In some demonstrative embodiments, the TWT ID field may include a value based on a User Priority (UP) field of the TSN stream, e.g., as described below.

In some demonstrative embodiments, device 140 may receive the STA-specific TWT scheduling message from device 102, e.g., as described below.

In some demonstrative embodiments, controller 154 may be configured to cause, trigger, and/or control the wireless communication station implemented by device 140 to process the STA-specific TWT scheduling message from device 102 to indicate that the STA-specific TSN-enabled TWT SP is restricted to communication of TSN frames of at least device 140, e.g., as described below.

In some demonstrative embodiments, devices 102 and 140 may negotiate a setup of one or more parameters of the STA-specific TSN-enabled TWT SP, e.g., as described below.

In some demonstrative embodiments, controller 124 may be configured to cause, trigger, and/or control the wireless communication station implemented by device 102 to negotiate the setup of one or more parameters of the STA-specific TSN-enabled TWT SP with at least one STA, for example, device 140, e.g., as described below.

In some demonstrative embodiments, controller 154 may be configured to cause, trigger, and/or control the wireless communication station implemented by device 140 to negotiate the setup of one or more parameters of the STA-specific TSN-enabled TWT SP with device 102, e.g., as described below.

In some demonstrative embodiments, controller 154 may be configured to cause, trigger, and/or control the wireless communication station implemented by device 140 to transmit a first TWT setup frame to device 102 and to receive from device 102 a second TWT setup frame, e.g., as described below.

In some demonstrative embodiments, controller 124 may be configured to cause, trigger, and/or control the wireless communication station implemented by device 102 to process the first TWT setup frame from device 140 and to transmit to device 140 the second TWT setup frame, e.g., as described below.

In some demonstrative embodiments, the first TWT setup frame may include a TWT ID field including a TSN stream ID, and the second TWT setup frame may include the TWT scheduling message to schedule the TSN-enabled TWT SP for the TSN stream ID, e.g., as described below.

In some demonstrative embodiments, devices 102 and 140 may negotiate a setup of one or more parameters of a trigger-based STA-specific TSN-enabled TWT SP, e.g., as described below.

In some demonstrative embodiments, controller 124 may be configured to cause, trigger, and/or control the wireless communication station implemented by device 102 to transmit to device 140 an unsolicited TWT response frame including the TWT scheduling message to schedule the TSN-enabled TWT SP for a TSN stream ID of device 140, e.g., as described below.

In some demonstrative embodiments, controller 154 may be configured to cause, trigger, and/or control the wireless communication station implemented by device 140 to receive from device 102 the unsolicited TWT response frame including the TWT scheduling message to schedule the TSN-enabled TWT SP for the TSN stream ID of device 140, e.g., as described below.

In some demonstrative embodiments, a TSN-enabled TWT may be defined, for example, as one or more broadcast TWT(s). For example, the TSN-enabled TWT may be a broadcast TWT, during which only TSN data can be transmitted.

In some demonstrative embodiments, there may be one or more requirements and/or access rules defined for TSN-enabled Broadcast TWT Service Periods.

For example, one or more STAs, e.g., all 802.11ax STAs, may be required to decode TWT configuration information in a beacon, e.g., in a Broadcast TWT Element, and identify the TSN-enabled TWT. For example, STAs with no TSN data traffic shall not initiate a transmission that overlaps with the TSN-enabled broadcast TWT.

In other embodiments, the TSN-enabled Broadcast TWT Service Periods may be defined and/or assigned according to other additional or alternative requirements and/or criteria.

In some demonstrative embodiments, device 102 may allocate a broadcast TSN-enabled TWT SP.

In some demonstrative embodiments, controller 124 may be configured to cause, trigger, and/or control the wireless communication station implemented by device 102 to allocate a broadcast TSN-enabled TWT SP, e.g., as described below.

In some demonstrative embodiments, controller 124 may be configured to cause, trigger, and/or control the wireless communication station implemented by device 102 to transmit a broadcast TWT scheduling message to indicate that the broadcast TSN-enabled TWT SP is restricted to communication of TSN frames, e.g., as described below.

In some demonstrative embodiments, device 140 may receive the broadcast TWT scheduling message from device 102, e.g., as described below.

In some demonstrative embodiments, controller 154 may be configured to cause, trigger, and/or control the wireless communication station implemented by device 140 to process the broadcast TWT scheduling message from device 140 to indicate that the TSN-enabled TWT SP is allocated as a broadcast TSN-enabled TWT SP restricted to communication of TSN frames, e.g., as described below.

In some demonstrative embodiments, device 102 may transmit a beacon frame to allocate a broadcast TWT SP as the broadcast TSN-enabled TWT SP, e.g., as described below.

In some demonstrative embodiments, controller 124 may be configured to cause, trigger, and/or control the wireless communication station implemented by device 102 to transmit a beacon including a TWT element to allocate a broadcast TWT SP as the broadcast TSN-enabled TWT SP, e.g., as described below.

In some demonstrative embodiments, the TWT element may include a TWT flow identifier including a predefined TWT flow identifier value to indicate that frames transmitted during the broadcast TWT SP are restricted to TSN frames, e.g., as described below.

In some demonstrative embodiments, the predefined TWT flow identifier value may be 4.

In one example, the TWT flow identifier may be included as part of a request type field of the TWT element. In another example, the TWT flow identifier may be included as part of any other field of the TWT element In other embodiments, the predefined TWT flow identifier value may include any other number and/or value.

In some demonstrative embodiments, the TWT element may include a control field, and a Broadcast TWT information (info) subfield, e.g., as described below.

In some demonstrative embodiments, the control field may include a broadcast field value to indicate that the TWT SP is the broadcast TWT SP, e.g., as described below.

In some demonstrative embodiments, the Broadcast TWT info subfield may include a broadcast TWT ID field including a value based on a TSN ID, e.g., as described below.

In some demonstrative embodiments, device 140 may receive from device 102 the beacon frame to allocate the broadcast TWT SP as the broadcast TSN-enabled TWT SP, e.g., as described below.

In some demonstrative embodiments, controller 154 may be configured to cause, trigger, and/or control the wireless communication station implemented by device 140 to process the beacon from device 102 including the TWT element to allocate the broadcast TWT SP as the broadcast TSN-enabled TWT SP, e.g., as described below.

In one example, devices 102 and 140 may communicate the beacon including the TWT element including the TWT flow identifier including the value 4, the control field, and/or the Broadcast TWT information (info) subfield e.g., as described below.

Figure 4:
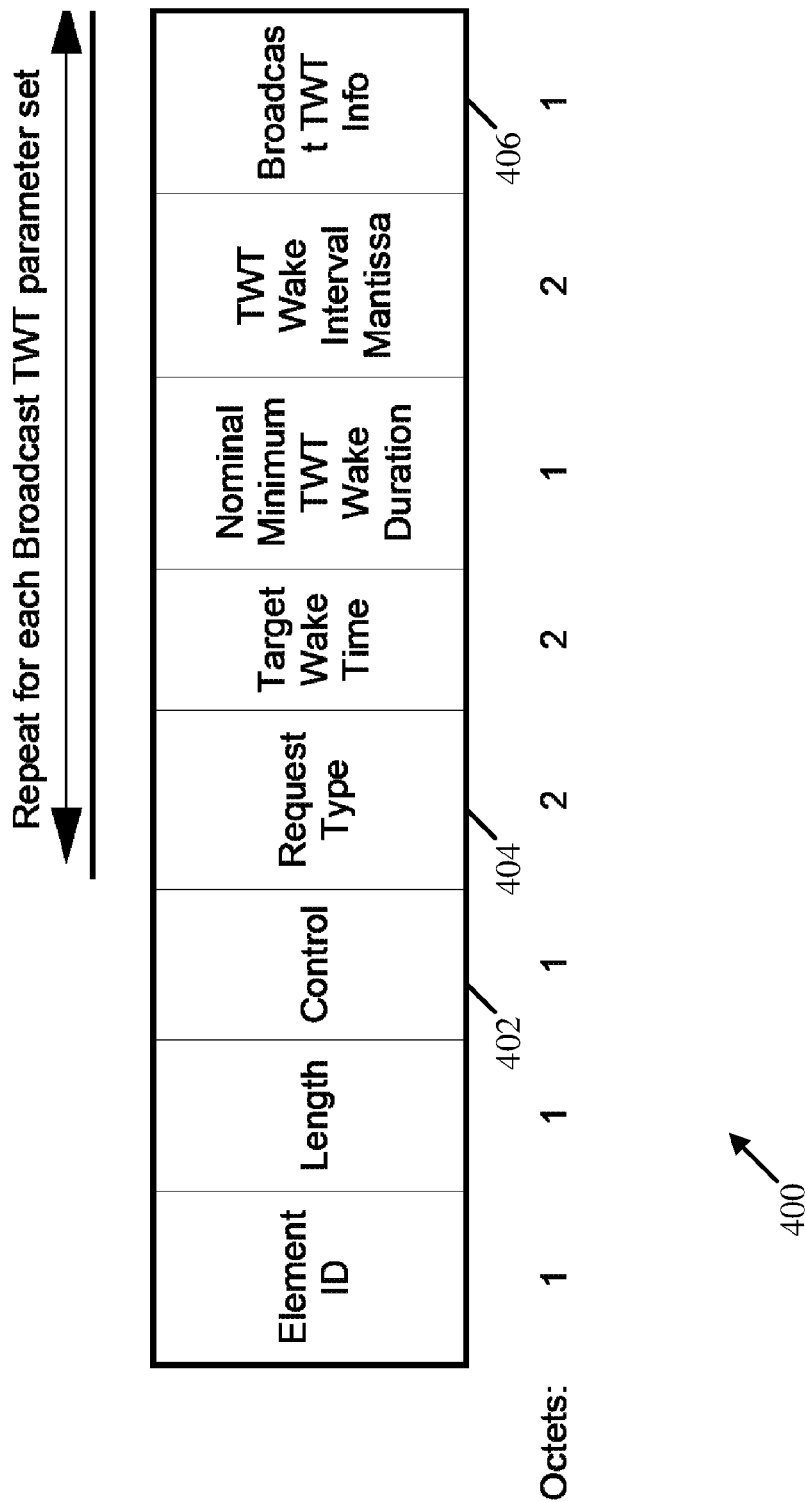
FIG. 4 is a schematic illustration of a Target Wakeup Time (TWT) element, which may be implemented in accordance with some demonstrative embodiments.

Reference is made to FIG. 4, which schematically illustrates a TWT element 400, which may be implemented in accordance with some demonstrative embodiments.

For example, as shown in FIG. 4, the TWT element 400 may include a control field 402, a request type field 404, and a broadcast TWT info subfield 406, e.g., as described below.

In some demonstrative embodiments, devices 102 and/or 140 (FIG. 1) may be configured to utilize a TSN-enabled Broadcast TWT Signaling mechanism to signal a TSN-enabled Broadcast TWT, e.g., as described below.

In some demonstrative embodiments, the TWT Flow Identifier may be included as part of request type field 404 of TWT element 404, e.g., as described below.

In other embodiments, the TWT Flow Identifier may be included as part of any other field of TWT element 404.

In some demonstrative embodiments, an AP, e.g., device 102 (FIG. 1), may announce a TSN-enabled Broadcast TWT, for example, by setting a field or indicator, for example, a TWT Flow Identifier, to a predefined value configured to signal a TSN-enable TWT, e.g., as follows:

TABLE 1

| TWT Flow Identifier field value | Description when transmitted in a broadcast TWT element |
|---|---|
| 0 | No constraints on the frames transmitted during a broadcast TWT SP. |
| 1 | Frames transmitted during a broadcast TWT SP by a TWT scheduled STA are recommended to be limited to solicited feedback and status: PS-Poll and QoS Null frames and HT TB NDP PPDUs Feedback can be contained in(#7359) the QoS Control field or in the HE variant HT Control field of the frame, if either is present (see 27.5.1 (HE DL MU operation), 27.5.3 (UL MU operation), 27.8 (Operating mode indication), 27.13 (Link adaptation using the HLA Control field), etc.)(#7930) Frames that are sent as part of a sounding feedback exchange (see 27.6 (HE sounding protocol)) Management frames: Action or Action No Ack frames Control response frames(#7598) Trigger frames transmitted by the TWT scheduling AP during the broadcast TWT SP do not contain RUs for random access (see 27.7.3.2 (Rules for TWT scheduling AP)), otherwise, there are no other restrictions on the frames transmitted by the TWT scheduling AP. (#7929). |
| 2 | Frames transmitted during a broadcast TWT SP by a TWT scheduled STA(#9844) are recommended to be limited to solicited status and feedback: PS-Poll and QoS Null frames Feedback can be contained in(#6353) the QoS Control field or in the HE variant HT Control field of the frame, if either is |

TABLE 1-continued

| TWT Flow Identifier field value | Description when transmitted in a broadcast TWT element |
|---|---|
| | present (see 27.5.1 (HE DL MU operation), 27.5.3 (UL MU operation), 27.8 (Operating mode indication), 27.13 (Link adaptation using the HLA Control field), etc.)(#7930) Frames that are sent as part of a sounding feedback exchange (see 27.6 (HE sounding protocol)) Management frames: Action, Action No Ack frames or (Re)Association(#7931) Request frames Control response frames(#7599) Trigger frames transmitted by the TWT scheduling AP during the broadcast TWT SP contain at least one RU for random access (see 27.7.3.2 (Rules for TWT scheduling AP)), otherwise there are no restrictions on the frames transmitted by the TWT scheduling AP. (#7929). |
| 3 | No constraints on the frames transmitted during a broadcast TWT SP except that the AP transmits a TIM frame or a FILS Discovery frame(#7932) including a TIM element at the beginning of each TWT SP (see 27.14.3.2 (AP operation for opportunistic power save)). |
| 4 | Frames transmitted during a broadcast TWT SP are restricted to frames belonging to a TSN stream. |
| 5-7 | Reserved |

For example, as shown in Table 1, the TWT Flow Identifier field value may be set to a value of "4" to indicate a TSN-enabled Broadcast TWT SP, in which frames transmitted during the broadcast TWT SP are to be restricted to frames belonging to a TSN stream. In other embodiments, any other value may be used to indicate the TSN-enabled Broadcast TWT SP.

In other embodiments, any other field, element or indicator may be implemented to indicate, advertize, define, signal and/or announce the TSN-enabled Broadcast TWT.

Figure 5:
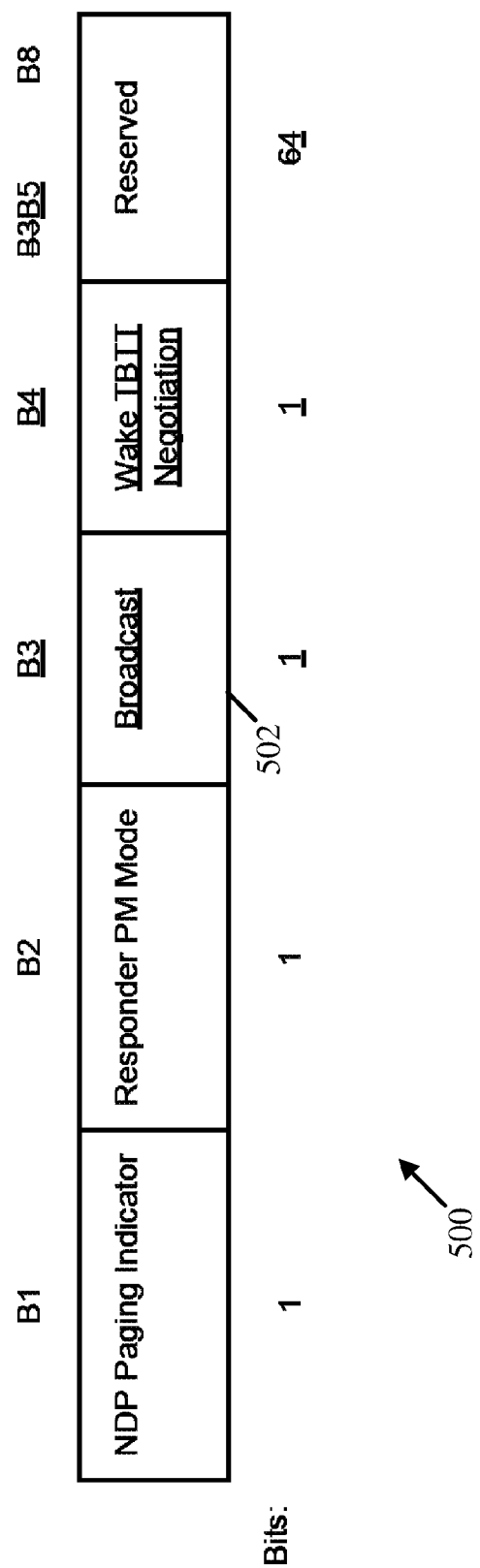
FIG. 5 is a schematic illustration of a control field, which may be implemented in accordance with some demonstrative embodiments.

Reference is made to FIG. 5, which schematically illustrates a control field format 500, which may be implemented in accordance with some demonstrative embodiments.

In one example, the control field 500 may be included as part of the control field 402 (FIG. 4) in the TWT element 400 (FIG. 4).

In some demonstrative embodiments, as shown in FIG. 5, control field 500 may include a broadcast subfield 502 configured to indicate whether the TWT is a broadcast TWT SP. For example, the broadcast subfield 502 may be set to a predefined value, e.g., "1", to indicate a broadcast TWT SP.

Figure 6:
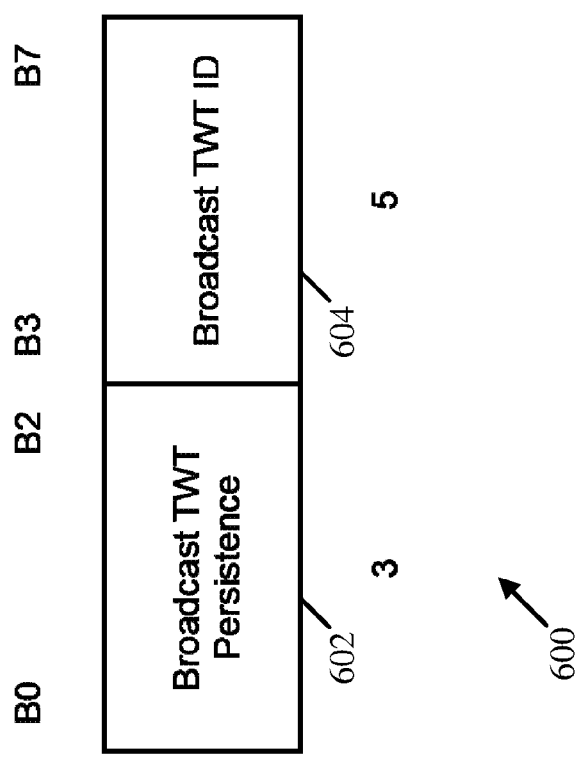
FIG. 6 is a schematic illustration of a broadcast TWT information subfield format, which may be implemented in accordance with some demonstrative embodiments.

Reference is made to FIG. 6, which schematically illustrates a format of a broadcast TWT information subfield 600, which may be implemented in accordance with some demonstrative embodiments.

In one example, the broadcast TWT information subfield 600 may be included as part of the broadcast TWT information subfield 406 (FIG. 4) in the TWT element 400 (FIG. 4).

In some demonstrative embodiments, as shown in FIG. 6, the broadcast TWT information subfield may include a broadcast TWT persistence subfield 602 and a broadcast TWT ID field 604.

In some demonstrative embodiments, the Broadcast TWT ID field 604 may include a value based on a TSN ID, e.g., as described below.

In some demonstrative embodiments, an AP, e.g., device 102 (FIG. 1), may transmit a TWT element, e.g., TWT element 400 (FIG. 4), for example, to advertize a broadcast TWT as a TSN-enabled TWT.

For example, the AP may set the broadcast field 502 (FIG. 5) to a predefined value, e.g., "1", to indicate a broadcast TWT.

For example, the AP may set the broadcast TWT ID field 604 to indicate a TSN ID, e.g., using an UP field of a TSN stream and/or any other information, for which the broadcast TWT is to be scheduled as a TSN-enabled TWT, e.g., as described below.

Referring back to FIG. 1, in some demonstrative embodiments, devices 102 and/or 140 may be configured to utilize a mechanism to support TSN stream identification and/or mapping to TSN-enabled TWT, e.g., as described below.

In some demonstrative embodiments, for example, a TSN stream may be identified by a UP field, for example, the 802.1Q UP field, e.g., as described below.

In some demonstrative embodiments, devices 102 and/or 140 may be configured to maintain a mapping between a TSN stream and a TSN-enabled TWT SP, e.g., as described below.

In some demonstrative embodiments, controller 124 may be configured to cause, trigger, and/or control the wireless communication station implemented by device 102 to maintain a mapping between a TWT ID of the TSN-enabled TWT SP and a UP field of a scheduled TSN stream, which is scheduled to the TSN-enabled TWT SP, e.g., as described below.

In some demonstrative embodiments, controller 154 may be configured to cause, trigger, and/or control the wireless communication station implemented by device 140 maintain a mapping between the TWT ID of the TSN-enabled TWT SP and the UP field of the scheduled TSN stream, which is scheduled to the TSN-enabled TWT SP, e.g., as described below.

In some demonstrative embodiments, the UP field may include a VLAN ID (VID) and/or a PriorityCodePoint (PCP).

In some demonstrative embodiments, for example, one or more specific requirements for a TSN stream may be defined by information, for example, a TSPEC or any other type or format of information, which may include, for example, a nominal and/or maximal MAC Service Data Unit (MSDU) size, a delay bound, a direction, e.g., Uplink (UL) or Downlink (DL), and/or one or more other parameters.

In some demonstrative embodiments, devices 102 and/or 140 may be configured to create, signal and/or implement a mapping, for example, between the UP field of a TSN and a TWT ID for the TSN-enabled TWT, e.g., as described below.

In some demonstrative embodiments, the mapping may be created, for example, when the TSN stream is admitted. For example, an AP, e.g., device 102, may assign a TSN stream of a STA, e.g., device 140, to a specific TSN-enabled TWT ID.

For example, the AP may use one or more TSN stream requirements (TSPEC), for example, direction and/or delay bounds, to schedule and/or configure the TSN-enabled TWT to serve the stream.

In one example, the AP may group UL streams, which can be served jointly, into a single TWT, for example, while still meeting the delay bounds.

In some demonstrative embodiments, one mechanism to facilitate a mapping between the TSN stream identification and the TWT ID, e.g., on both STA and AP, may include an implicit TSN-TWT mapping.

For example, the AP and/or the STA, e.g., each of the AP and the STA, may maintain a local mapping between the TSN stream and a particular TWT configuration. This mapping may be, for example, implementation dependent and the STA/APs may be responsible to ensure that the TSN-enabled TWT is configured to serve the proper TSN stream.

In some demonstrative embodiments, another mechanism to facilitate a mapping between the TSN stream identification and the TWT ID, e.g., on both STA and AP, may utilize a TWT identification, for example, using a dedicated and/or new TWT ID field.

For example, the TWT ID field, e.g., a new TWT ID field, which may be included in the STA-specific TWT scheduling message, may be defined, for example, for individual TWTs.

In one example, the TWT ID field may be set to one or more parameters in an UP field of a corresponding TSN stream.

In one example, the TWT ID field may be set to a value derived from the UP field of the TSN stream.

In some demonstrative embodiments, the TWT ID field may be included, for example, as a new field in a TWT element, e.g., TWT element 400 (FIG. 4), which may be used during a TWT negotiation.

In some demonstrative embodiments, another mechanism to facilitate a mapping between the TSN stream identification and the TWT ID, e.g., on both STA and AP, may utilize an Broadcast TWT ID value, for example, when the TSN-enabled TWT is configured as a broadcast TWT, e.g., as described above.

For example, a Broadcast TWT ID subfield within a Broadcast TWT Info field, e.g., the Broadcast TWT ID subfield 602 (FIG. 6) within the Broadcast TWT Info field 406 (FIG. 4), may be used to indicate the TSN stream ID. For example, a mapping between the TSN stream ID and the Broadcast TWT ID may be used.

In some demonstrative embodiments, a channel access within the TSN-enabled TWT may be restricted, for example, to TSN communications, e.g., as described below.

For example, only TSN data may be allowed for transmission during a TSN-enabled TWT.

In some demonstrative embodiments, for example, an access mode during a TSN-enabled TWT may be configured, for example, by the AP, e.g., device 102.

In some demonstrative embodiments, the TSN-enabled TWT SP may include a contention-based TSN-enabled TWT SP, during which transmission is to be performed according to a contention-based mechanism, e.g., as described below.

In some demonstrative embodiments, controller 124 may be configured to cause, trigger, and/or control the wireless communication station implemented by device 102 to allocate the TSN-enabled TWT SP as a contention-based TSN-enabled TWT SP, during which transmission is to be performed according to a contention-based mechanism, for example, e.g., as described below.

In one example, the AP, e.g., device 102, may define the channel access to the TSN-enabled TWT according to an Enhanced Distributed Channel Access (EDCA) mechanism. For example, one or more STAs, e.g., device 140, may follow a standard EDCA access, and/or the AP may be responsible to ensure that contention level and/or channel access latency may be accepted by the TSN stream, for example, by controlling the number of STAs assigned to a given TSN-enabled TWT.

In another example, the AP, e.g., device 102, may utilize any other channel access mechanism.

In some demonstrative embodiments, the TSN-enabled TWT SP may include a trigger-based TSN-enabled TWT SP, during which transmission from the STA is to be triggered by a trigger frame from the AP, e.g., as described below.

In some demonstrative embodiments, controller 124 may be configured to cause, trigger, and/or control the wireless communication station implemented by device 102 to allocate the TSN-enabled TWT SP as a trigger-based TSN-enabled TWT SP, during which transmission is to be triggered by a trigger frame from the AP, e.g., as described below.

In one example, the AP, e.g., device 102, may define the channel access to the TSN-enabled TWT to be a trigger-based TWT. For example, a STA, e.g., device 140, shall wait for the AP to send a trigger frame in order to respond with TSN data. For example, APs may use priority access to send TSN data or any other frame types on the downlink.

In some demonstrative embodiments, a TSN-enabled TWT may be protected, for example, against Overlapping BSS (OBSS) interference and/or Legacy STA interference, e.g., as described below.

In some demonstrative embodiments, for example, the TSN-enabled TWT may be used in a managed network, where a central network management entity controls access, e.g., admission control.

In some demonstrative embodiments, for example, interference from OBSS operation and/or legacy devices may be controlled, for example, by frequency planning and/or configuration. In one example, a dedicated channel/BSS can be used for TSN streams.

In some demonstrative embodiments, for example, when the TSN-enabled Broadcast TWT is announced in a beacon, e.g., the beacon including the TWT element from device 102 to device 140, an AP, e.g., device 102, may include a TWT bitmap to represent a beacon interval, e.g., until a next beacon. For example, a bit, e.g., each bit, in the bitmap may be configured to represent a TWT service period, e.g., 1 millisecond (ms) or any other period. For example, a bit corresponding to a TWT service period may be set to a predefined value, e.g., "1", to indicate that this service period is reserved and that STAs shall not use it, e.g., unless they know that the period is reserved for them.

In some demonstrative embodiments, devices 102 and/or 140 may be configured to utilize a mechanism to support mapping of a time-aware schedule, e.g., an 802.1Qbv schedule, to a TWT service period, e.g., as described below.

In some demonstrative embodiments, for example, one or more APs, e.g., device 102, may be configured to operate as an 802.1Qbv proxy for its associated STAs, e.g., including device 140, that have TSN streams, for example, in order to support extending the 802.1Qbv schedule to a wireless network.

In some demonstrative embodiments, the AP, e.g., device 102, may be configured to execute a 802.1Qbv wireless proxy application running on the AP or any another application co-located with the AP or running in another device, which may be responsible for performing the 802.1Qbv negotiation and/or configuration with one or more CUC/CNC entities, for example, according to the network management model described above with reference to FIG. 2.

In some demonstrative embodiments, for example, once the configuration is completed, the AP may receive an 802.1Qbv Time-Aware schedule for the TSN streams running in the STAs under its control.

In some demonstrative embodiments, the AP may forward the schedule to the STAs.

In some demonstrative embodiments, at this stage the AP and STAs may both be aware of the timing requirements for the TSN streams, e.g., for each STA.

In some demonstrative embodiments, the AP, e.g., device 102, and the one or more STAs, e.g., device 140, may perform negotiation of one or more TSN-enabled TWT parameters, for example, to meet the requirements defined by the 802.1Qbv schedule.

In some demonstrative embodiments, the AP and/or the STA, e.g., both the AP and STA, may include the TSN stream ID in the TWT negotiation frames, such that both sides may know the precise timing constraints given by 802.1Qbv, e.g., when packets are expected to arrive in the queues.

In some demonstrative embodiments, for example, alternatively to the negotiation, a mapping between the TSN stream ID and the TWT configuration may be stored, e.g., locally at the STA/AP, as described above. According to these embodiments, the AP and the STA may be responsible for making the correct association between TSN stream data and specific TWTs.

In some demonstrative embodiments, the TWT negotiation has to be successfully completed, e.g., both sides must agree on the TWT parameters, for example, in order to ensure the 802.1Qbv timing requirements can be met.

In some demonstrative embodiments, STAs, e.g., device 140, may be required to accept the TWT parameters set by the AP, e.g., device 102, which may operate as a "master".

In some demonstrative embodiments, a request/response negotiation process may be used and both sides, e.g., the AP and the STA, may agree on the final TWT parameters. In one example, one or more specific requirements for the negotiation process may be defined in a future IEEE 802.11 specification and/or in a certification program.

In some demonstrative embodiments, device 102 may be configured to reschedule the at least one TSN-enabled TWT SP, e.g., as described below.

In some demonstrative embodiments, controller 124 may be configured to cause, trigger, and/or control the wireless communication station implemented by device 102 to reschedule the at least one TSN-enabled TWT SP, for example, based on a change in one or more wireless channel conditions between device 102 and device 140, e.g., as described below.

In some demonstrative embodiments, channel conditions over wireless links in some wireless networks, e.g., wireless links in 802.11 networks, may change, e.g., compared to wired Ethernet links, where conditions may be kept substantially constant. Accordingly, there may be a need to renegotiate/update one or more of the TWT parameters between the AP and STA.

In some demonstrative embodiments, renegotiation and/or updating of the TWT parameters may be triggered by one or more events, e.g., significant channel condition change, and/or in a periodic manner.

In some demonstrative embodiments, for example, in certain scenarios, the AP(s) may involve the central controller to update the time-aware schedules, for example, so that the overall system operates at some target performance level for the admitted TSN streams.

In some demonstrative embodiments, APs and/or STAs may trigger TWT renegotiation, which may lead to updated TWT configuration parameters. In one example, typical TWT negotiation signaling may be reused, and TSN stream ID information, e.g. as part of TWT ID or Broadcast TWT ID, or implicit, may be used in the negotiation.

Figure 7:
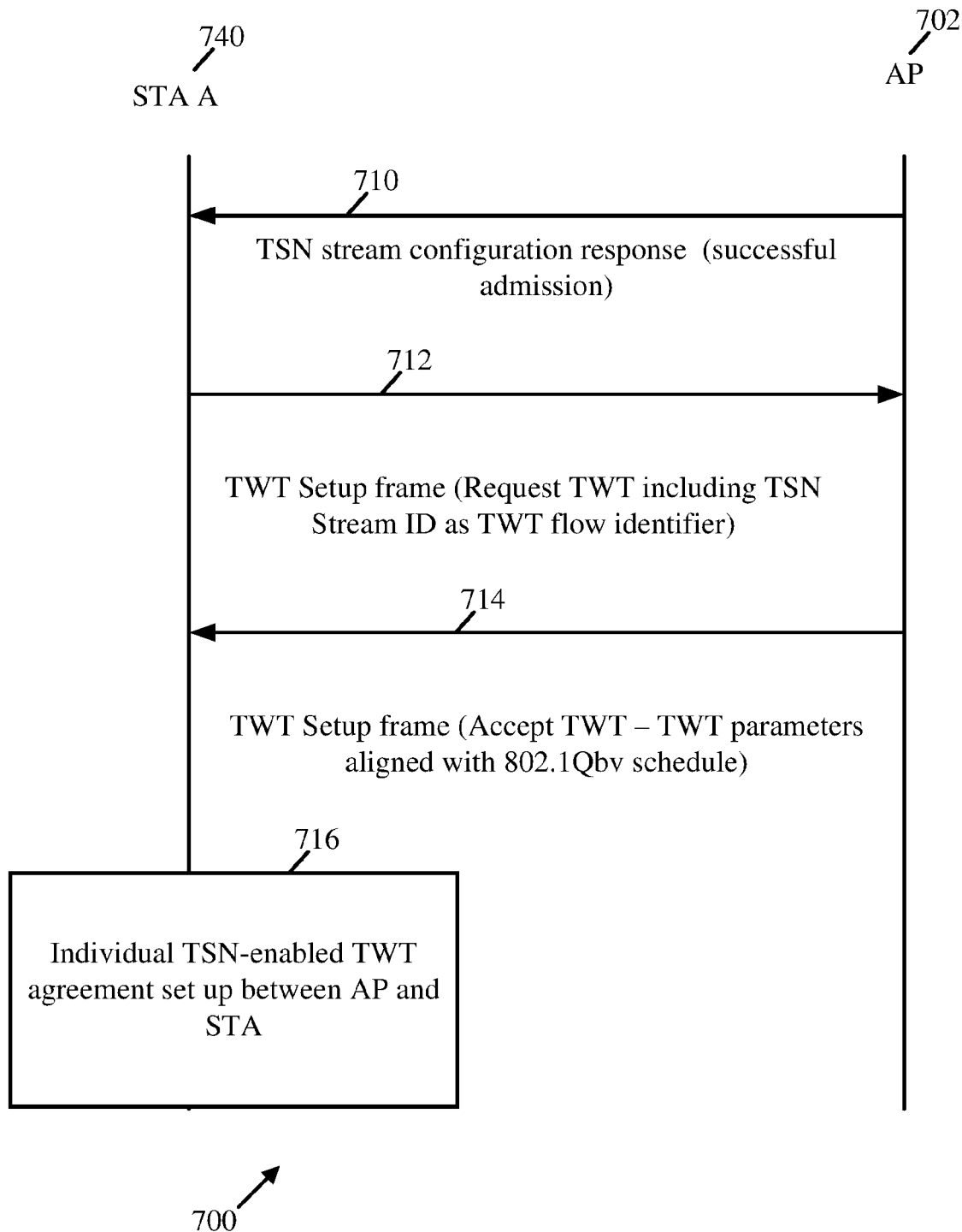
FIG. 7 is a schematic illustration of a sequence diagram of operations and communications between an Access Point (AP) and a wireless communication station (STA) to negotiate a Time Sensitive Networking (TSN) enabled (TSN-enabled) TWT Service Period (SP), in accordance with some demonstrative embodiments.

Reference is made to FIG. 7, which schematically illustrates a sequence diagram 700 of operations and communications between an AP 702 and a STA 740 to negotiate a TSN-enabled TWT SP, in accordance with some demonstrative embodiments.

In one example, device 102 (FIG. 1) may be configured to operate as, perform a role of, and/or perform one or more functionalities of, AP 702; and/or device 140 (FIG. 1) may be configured to operate as, perform a role of, and/or perform one or more functionalities of the STA 740.

In some demonstrative embodiments, for example, an AP, e.g., device 102 (FIG. 1), and/or a STA, e.g., device 140, may implement one or more operations and/or communications of FIG. 7, for example, to negotiate an individual TSN-enabled TWT setup.

In some demonstrative embodiments, as shown in FIG. 7, AP 702 may transmit a TSN stream configuration response 710, for example, to indicate to STA 740 a successful admission.

In some demonstrative embodiments, as shown in FIG. 7, STA 740 may transmit a first TWT setup frame 712 to AP 702, for example, to request to setup a TSN enabled TWT.

In some demonstrative embodiments, as shown in FIG. 7, AP 702 may transmit a second TWT setup frame 714 to STA 740, for example, to accept the request to setup the TSN enabled TWT, which may be aligned with a 801.1Qbv schedule.

In some demonstrative embodiments, as indicated by block 716 in FIG. 7, an individual TSN enabled TWT agreement may be set up between AP 702 and STA 740, for example, based on acceptance by AP 702 of the request to setup the TSN enabled TWT.

In some demonstrative embodiments, an AP, e.g., device 102 (FIG. 1), and a STA, e.g., device 140 (FIG. 1), may implement one or more operations and or communications of FIG. 7, for example, to set up a TSN-enabled TWT as a broadcast TWT, for example, by setting the broadcast TWT info subfield in the TWT element, e.g., the broadcast TWT info subfield 406 (FIG. 4) and/or by setting the parameters for a broadcast TWT, e.g., as described above.

Figure 8:
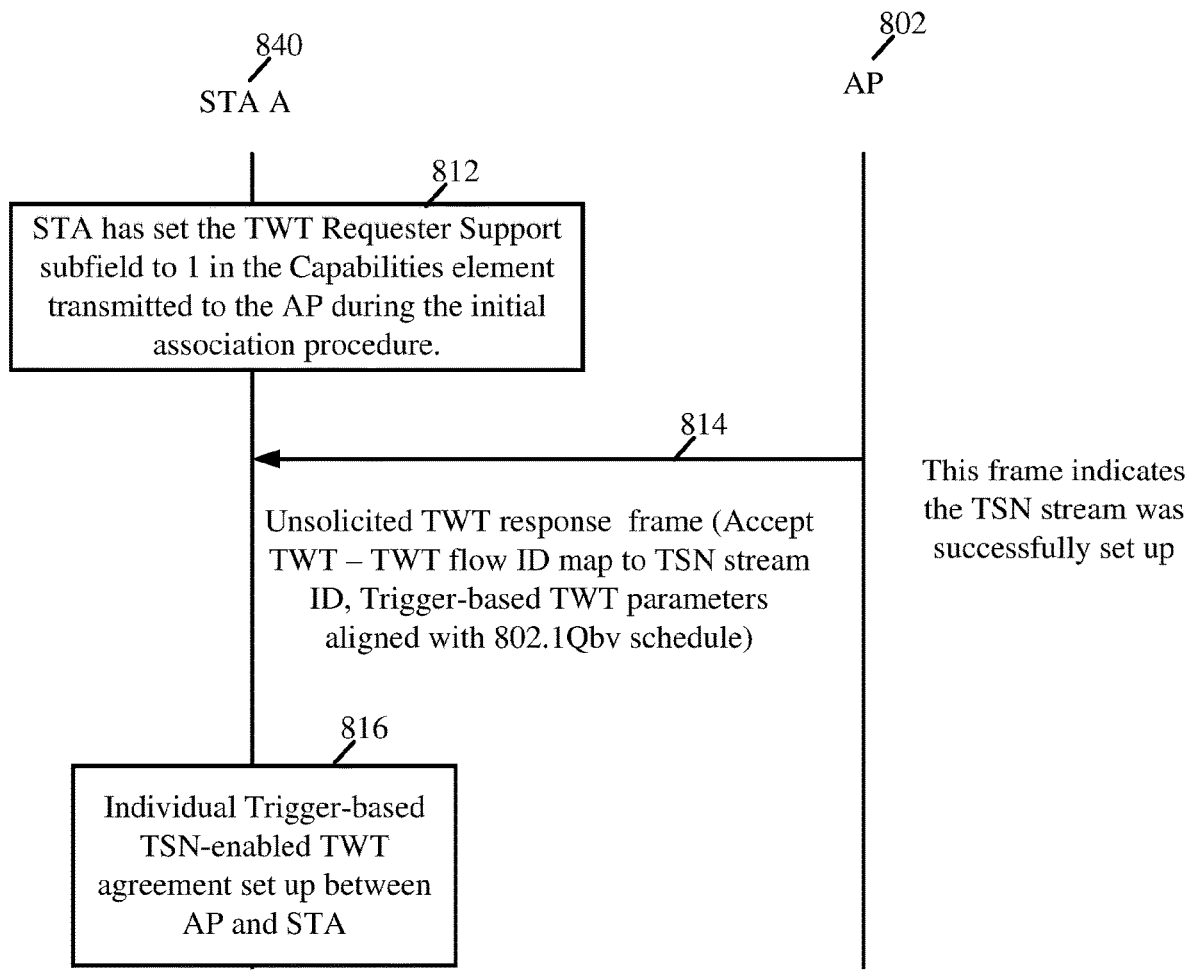
FIG. 8 is a schematic illustration of a sequence diagram of operations and communications between an AP and a STA to negotiate a TSN-enabled TWT SP, in accordance with some demonstrative embodiments.

Reference is made to FIG. 8, which schematically illustrates a sequence diagram 800 of operations and communications between an AP 802 and a STA 840 to negotiate a TSN-enabled TWT SP, in accordance with some demonstrative embodiments.

In one example, device 102 (FIG. 1) may be configured to operate as, perform a role of, and/or perform one or more functionalities of, AP 802; and/or device 140 may be configured to operate as, perform a role of, and/or perform one or more functionalities of the STA 840.

In some demonstrative embodiments, for example, an AP, e.g., device 102 (FIG. 1), and/or a STA, e.g., device 140 (FIG. 1), may implement one or more operations and/or communications of FIG. 8, for example, to negotiate an individual trigger-based TSN-enabled TWT setup.

In some demonstrative embodiments, as shown in FIG. 8, STA 840 may indicate 812 to the AP 802, e.g., during the association process, that the STA 840 supports a trigger-based TSN-enabled TWT.

For example, STA 840 may transmit to AP 802, e.g., during an initial association procedure between STA 840 and AP 802, a capability element including a TWT Requester Support subfield set to "1", for example, to indicate that STA 840 supports a trigger-based TSN-enabled TWT.

In some demonstrative embodiments, as shown in FIG. 8, AP 802 may transmit to STA 840 an unsolicited TWT response frame 814 including, for example, a TWT scheduling message to schedule the TSN-enabled TWT SP for a TSN stream ID of a TSN stream of STA 840.

In some demonstrative embodiments, the unsolicited TWT response frame 814 may indicate that the TSN stream of STA 840 is successfully set up.

In some demonstrative embodiments, as indicated by block 816 of FIG. 8, an individual trigger-based TSN-enabled TWT agreement may be set up between AP 802 and STA 840, for example, based on successful set up of the TSN stream of STA 840.

In some demonstrative embodiments, an AP, e.g., device 102 (FIG. 1), and a STA, e.g., device 140 (FIG. 1), may implement one or more operations and or communications of FIG. 8, for example, to set up a trigger-based TSN-enabled TWT as a broadcast TWT, for example, by setting the broadcast TWT info subfield in the TWT element, e.g., the broadcast TWT info subfield 406 (FIG. 4) and/or by setting the parameters for a broadcast TWT, e.g., as described above.

Figure 9:
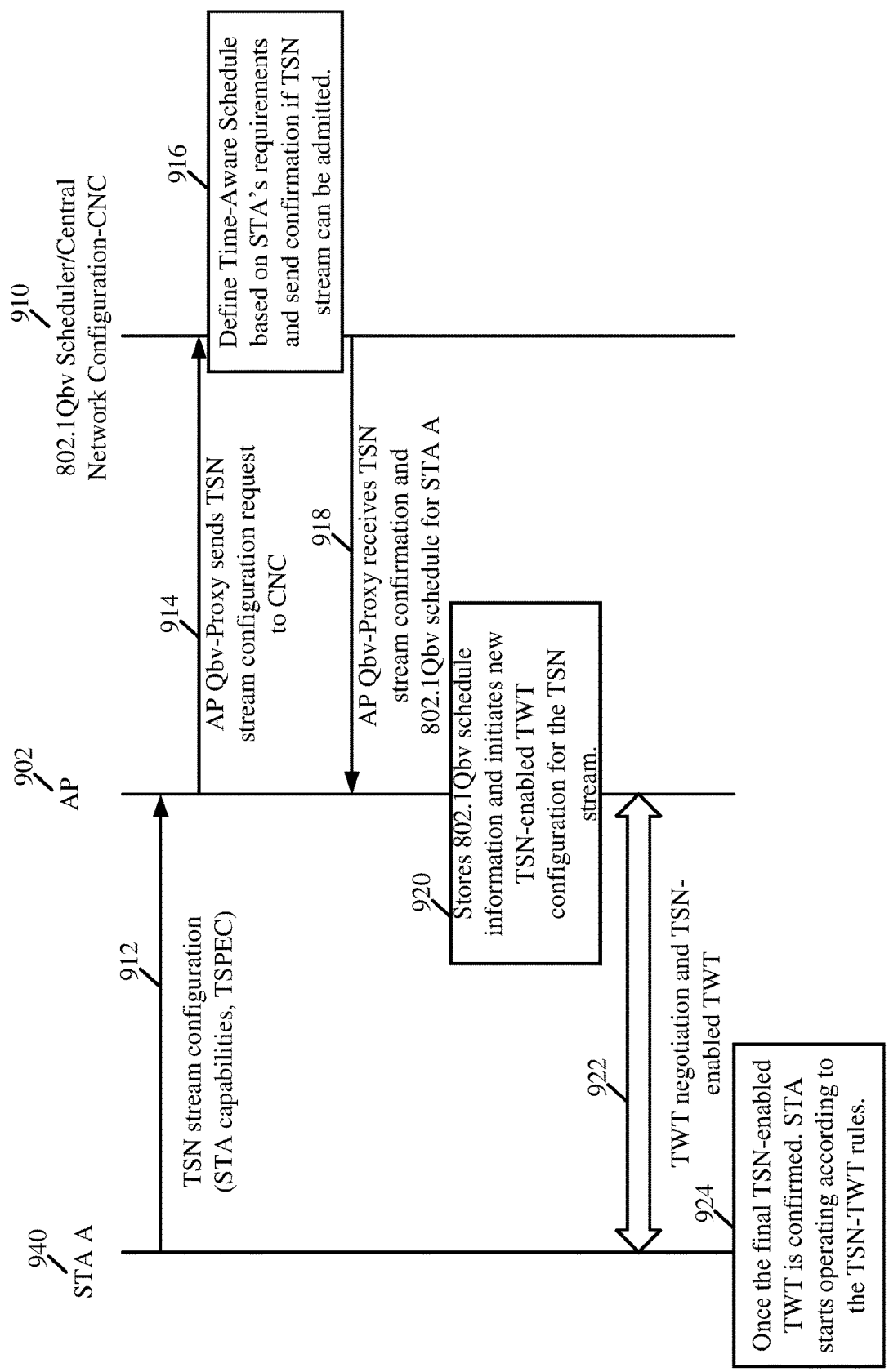
FIG. 9 is a schematic illustration of a sequence diagram of operations and communications to schedule TSN communications during one or more TSN-enabled TWTs, in accordance with some demonstrative embodiments.

Reference is made to FIG. 9, which schematically illustrates a sequence diagram 900 of operations and communications to schedule TSN communications during one or more TSN-enabled TWTs, in accordance with some demonstrative embodiments.

In some demonstrative embodiments, one or more of the operations and/or communication of FIG. 9 may be performed between a STA 940, an AP 902, and a central entity 910, e.g., as described below.

In one example, device 102 (FIG. 1) may be configured to operate as, perform a role of, and/or perform one or more functionalities of, AP 902 and/or central entity 910; and/or device 140 (FIG. 1) may be configured to operate as, perform a role of, and/or perform one or more functionalities of the STA 940.

In one example, central entity 910 may include one or more elements and/or components of, and/or may perform one or more operations and/or functionalities of, CUC entity 202 (FIG. 2) and/or CNC entity 204 (FIG. 2).

In some demonstrative embodiments, as shown in FIG. 9, STA 940 may transmit a TSN stream configuration request 912 to request to configure a TSN enabled TWT for a TSN stream of STA 940.

In some demonstrative embodiments, TSN stream configuration request 912 may include, for example, STA capabilities of STA 940 and/or TSPEC information.

In some demonstrative embodiments, as shown in FIG. 9, AP 902 may forward 914 the request to central entity 910 to configure the TSN enabled TWT for the TSN stream of STA 940.

In some demonstrative embodiments, as shown in FIG. 9, central entity 910 may define (916) a time aware schedule for the TSN enabled TWT, for example, based on requirements from the STA 940.

In some demonstrative embodiments, as shown in FIG. 9, central entity 910 may send a TSN stream confirmation 918, for example, if the TSN stream may be admitted.

In some demonstrative embodiments, as shown in FIG. 9, TSN stream confirmation 918 may include a time aware schedule, e.g., an 802.11Qbv schedule, for STA 940.

In some demonstrative embodiments, as shown in FIG. 9, AP 902 may store (920) schedule information of the time aware schedule and may initiate a new TSN enabled TWT configuration for the TSN stream of STA 940.

In some demonstrative embodiments, as shown in FIG. 9, AP 902 and STA 940 may perform a negotiation 922 for the setup of one or more parameters of the TSN-enabled TWT.

In one example, negotiation 922 may include one or more operations and/or communications of the operations and communications of FIG. 7 and/or FIG. 8.

In some demonstrative embodiments, as shown in FIG. 9, STA 940 may communicate (924) the TSN stream according to the one or more parameters of the TSN-enabled TWT, for example, once the negotiation ends and the one or more parameters of the TSN-enabled TWT are confirmed.

Figure 10:
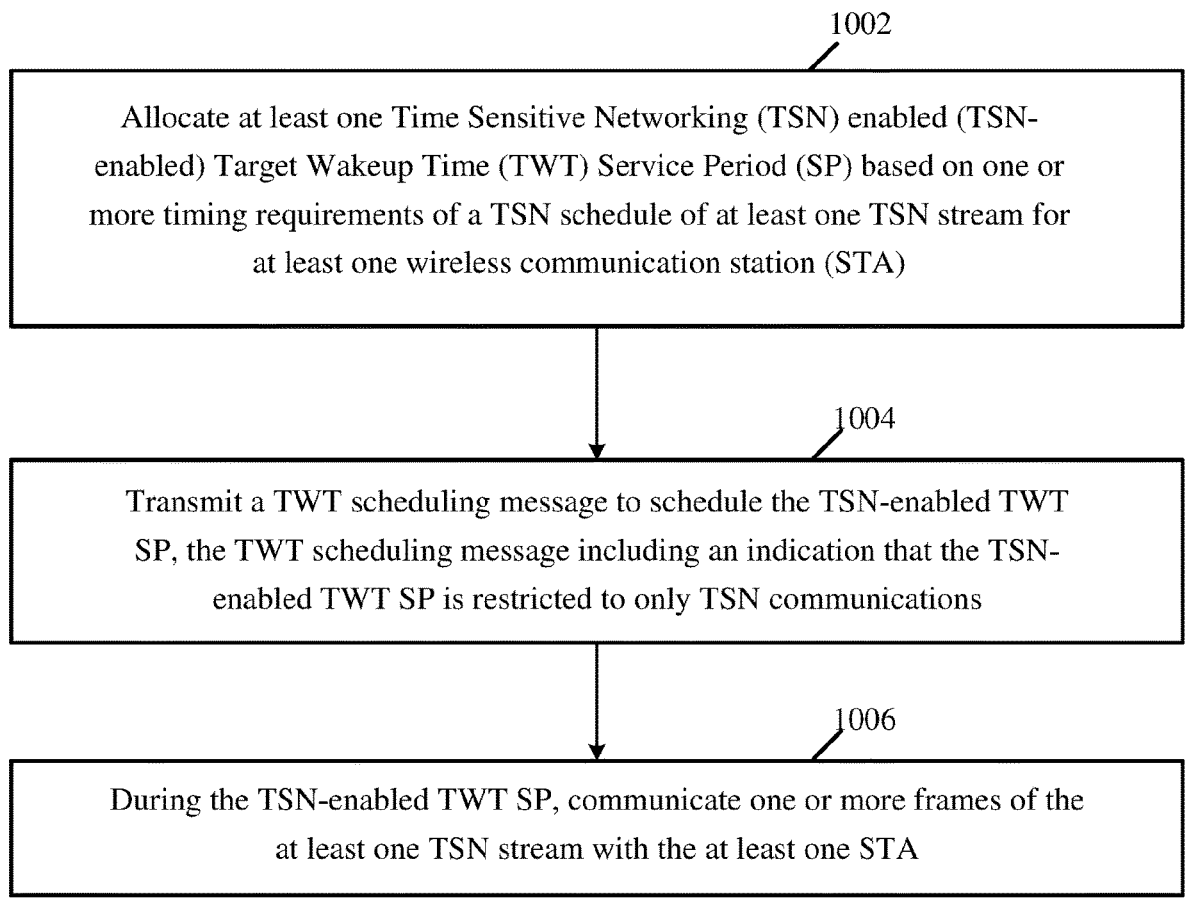
FIG. 10 is a schematic flow-chart illustration of a method of scheduling TSN wireless communications, in accordance with some demonstrative embodiments.

Reference is made to FIG. 10, which schematically illustrates a method of scheduling Time Sensitive Networking (TSN) wireless communications, in accordance with some demonstrative embodiments. For example, one or more of the operations of the method of FIG. 10 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1), and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 1002, the method may include allocating at an AP at least one TSN-enabled TWT SP based on one or more timing requirements of a TSN schedule of at least one TSN stream for at least one STA. For example, controller 124 (FIG. 1) may be configured to cause, trigger, and/or control the wireless communication station implemented by device 102 (FIG. 1) to allocate the at least one TSN-enabled TWT SP based on the one or more timing requirements of the TSN schedule of the at least one TSN stream for device 140 (FIG. 1), e.g., as described above.

As indicated at block 1004, the method may include transmitting a TWT scheduling message to schedule the TSN-enabled TWT SP, the TWT scheduling message including an indication that the TSN-enabled TWT SP is restricted to only TSN communications. For example, controller 124 (FIG. 1) may be configured to cause, trigger, and/or control the wireless communication station implemented by device 102 (FIG. 1) to transmit the TWT scheduling message to schedule the TSN-enabled TWT SP, the TWT scheduling message including the indication that the TSN-enabled TWT SP is restricted to only TSN communications, e.g., as described above.

As indicated at block 1006, the method may include, during the TSN-enabled TWT SP, communicating one or more frames of the at least one TSN stream with the at least one STA. For example, controller 124 (FIG. 1) may be configured to cause, trigger, and/or control the wireless communication station implemented by device 102 (FIG. 1) to, during the TSN-enabled TWT SP, communicate the one or more frames of the at least one TSN stream with device 140 (FIG. 1), e.g., as described above.

Figure 11:
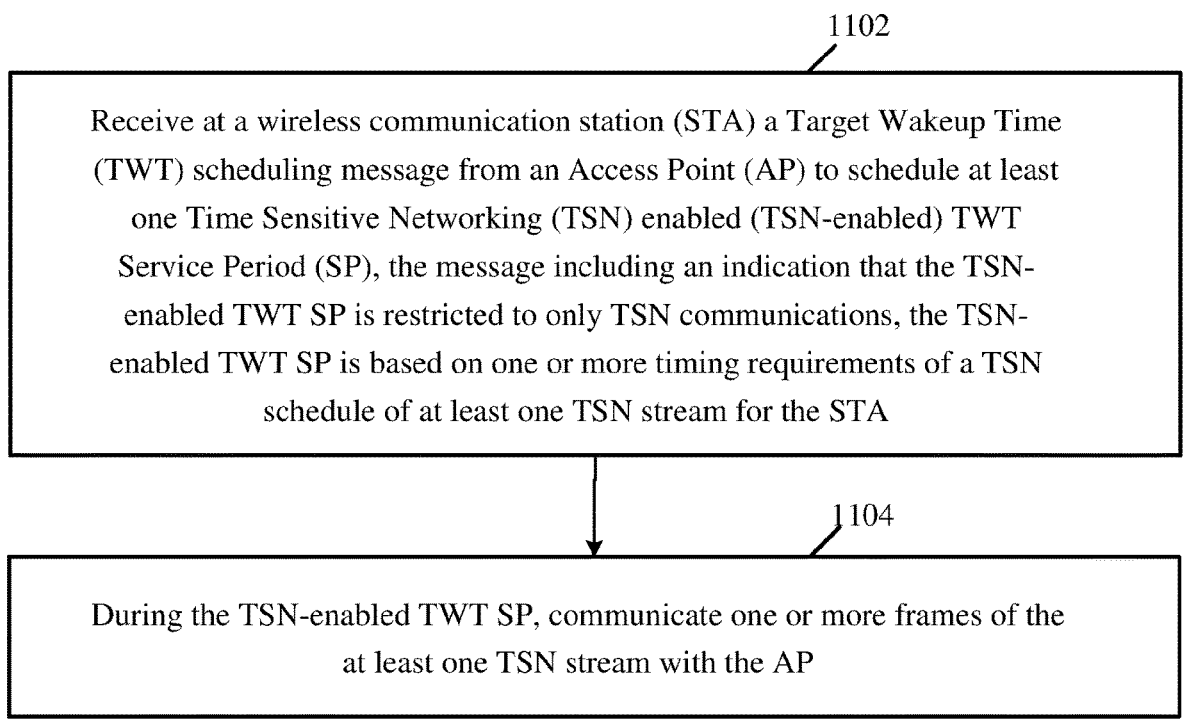
FIG. 11 is a schematic flow-chart illustration of a method of scheduling TSN wireless communications, in accordance with some demonstrative embodiments.

Reference is made to FIG. 11, which schematically illustrates a method scheduling Time Sensitive Networking (TSN) wireless communications, in accordance with some demonstrative embodiments. For example, one or more of the operations of the method of FIG. 11 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1), and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 1102, the method may include receiving at a STA a TWT scheduling message from an AP to schedule at least one TSN-enabled TWT SP, the message including an indication that the TSN-enabled TWT SP is restricted to only TSN communications, the TSN-enabled TWT SP is based on one or more timing requirements of a TSN schedule of at least one TSN stream for the STA. For example, controller 154 (FIG. 1) may be configured to cause, trigger, and/or control the wireless communication station implemented by device 140 (FIG. 1) to receive from device 102 (FIG. 1) the TWT scheduling message to schedule the at least one TSN-enabled TWT SP, the message including the indication that the TSN-enabled TWT SP is restricted to only TSN communications, and the TSN-enabled TWT SP is based on the one or more timing requirements of the TSN schedule of the at least one TSN stream for device 140 (FIG. 1), e.g., as described above.

As indicated at block 1104, the method may include, during the TSN-enabled TWT SP, communicating one or more frames of the at least one TSN stream with the AP. For example, controller 154 (FIG. 1) may be configured to cause, trigger, and/or control the wireless communication station implemented by device 140 (FIG. 1) to, during the TSN-enabled TWT SP, communicate the one or more frames of the at least one TSN stream with device 102 (FIG. 1), e.g., as described above.

Figure 12:
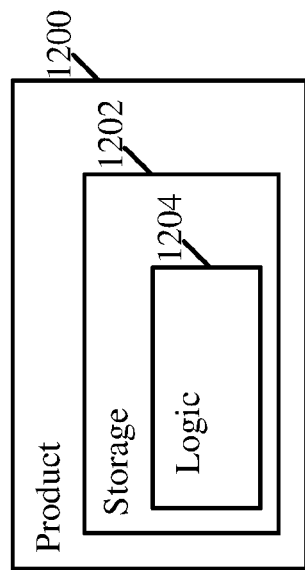
FIG. 12 is a schematic illustration of a product of manufacture, in accordance with some demonstrative embodiments.

Reference is made to FIG. 12, which schematically illustrates a product of manufacture 1200, in accordance with some demonstrative embodiments. Product 1200 may include one or more tangible computer-readable ("machine-readable") non-transitory storage media 1202, which may include computer-executable instructions, e.g., implemented by logic 1204, operable to, when executed by at least one computer processor, enable the at least one computer processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), and/or message processor 158 (FIG. 1), to cause device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), and/or message processor 158 (FIG. 1) to perform, trigger and/or implement one or more operations and/or functionalities, and/or to perform, trigger and/or implement one or more operations and/or functionalities described with reference to the FIGS. 1, 2, 3, 4, 5, 6, 7, 8, 9, 10 and/or 11, and/or one or more operations described herein. The phrases "non-transitory machine-readable medium" and "computer-readable non-transitory storage media" are directed to include all computer-readable media, with the sole exception being a transitory propagating signal.

In some demonstrative embodiments, product 1200 and/or machine-readable storage media 1202 may include one or more types of computer-readable storage media capable of storing data, including volatile memory, non-volatile memory, removable or non-removable memory, erasable or non-erasable memory, writeable or re-writeable memory, and the like. For example, machine-readable storage media 1202 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1204 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1204 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a wireless communication Access Point (AP) to allocate at least one Time Sensitive Networking (TSN) enabled (TSN-enabled) Target Wakeup Time (TWT) Service Period (SP) based on one or more timing requirements of a TSN schedule of at least one TSN stream for at least one wireless communication station (STA); transmit a TWT scheduling message to schedule the TSN-enabled TWT SP, the TWT scheduling message comprising an indication that the TSN-enabled TWT SP is restricted to only TSN communications; and during the TSN-enabled TWT SP, communicate one or more frames of the at least one TSN stream with the at least one STA.

Example 2 includes the subject matter of example 1, and optionally, wherein the apparatus is configured to cause the AP to allocate a STA-specific TSN-enabled TWT SP to at least one specific STA, and to transmit a STA-specific TWT scheduling message to indicate that the STA-specific TSN-enabled TWT SP is restricted to communication of TSN frames of the at least one specific STA.

Example 3 includes the subject matter of example 2, and optionally, wherein the STA-specific TWT scheduling message comprises a TWT Identifier (ID) field to map the STA-specific TWT SP to a TSN stream, the TWT ID field comprising a value based on a User Priority (UP) field of the TSN stream.

Example 4 includes the subject matter of example 2 or 3, and optionally, wherein the apparatus is configured to cause the AP to negotiate a setup of one or more parameters of the STA-specific TSN-enabled TWT SP with the at least one specific STA.

Example 5 includes the subject matter of any one of examples 2-4, and optionally, wherein the apparatus is configured to cause the AP to process a first TWT setup frame from the specific STA and to transmit to the specific STA a second TWT setup frame, the first TWT setup frame comprising a TWT Identifier (ID) field comprising a TSN stream ID, the second TWT setup frame comprising the TWT scheduling message to schedule the TSN-enabled TWT SP for the TSN stream ID.

Example 6 includes the subject matter of any one of examples 2-4, and optionally, wherein the apparatus is configured to cause the AP to transmit to the specific STA an unsolicited TWT response frame comprising the TWT scheduling message to schedule the TSN-enabled TWT SP for a TSN stream Identifier (ID) of the specific STA.

Example 7 includes the subject matter of any one of examples 1-6, and optionally, wherein the apparatus is configured to cause the AP to allocate a broadcast TSN-enabled TWT SP, and to transmit a broadcast TWT scheduling message to indicate that the broadcast TSN-enabled TWT SP is restricted to communication of TSN frames.

Example 8 includes the subject matter of example 7, and optionally, wherein the apparatus is configured to cause the AP to transmit a beacon comprising a TWT element to allocate a broadcast TWT SP as the broadcast TSN-enabled TWT SP, the TWT element comprising a TWT flow identifier comprising a predefined TWT flow identifier value to indicate that frames transmitted during the broadcast TWT SP are restricted to TSN frames.

Example 9 includes the subject matter of example 8, and optionally, wherein the predefined TWT flow identifier value is 4.

Example 10 includes the subject matter of example 8 or 9, and optionally, wherein the TWT element comprises a control field and a Broadcast TWT information (info) subfield, the control field comprising a broadcast field value to indicate that the TWT SP is the broadcast TWT SP, the Broadcast TWT info subfield comprising a broadcast TWT Identifier (ID) field, the Broadcast TWT ID field comprising a value based on a TSN ID.

Example 11 includes the subject matter of any one of examples 1-10, and optionally, wherein the apparatus is configured to cause the AP to maintain a mapping between a TWT identifier (ID) of the TSN-enabled TWT SP and User Priority (UP) field of a scheduled TSN stream, which is scheduled to the TSN-enabled TWT SP.

Example 12 includes the subject matter of any one of examples 1-11, and optionally, wherein the TSN schedule comprises one or more transmission windows for the at least one TSN, the apparatus configured to cause the AP to allocate the at least one TSN-enabled TWT SP based on the one or more transmission windows.

Example 13 includes the subject matter of any one of examples 1-12, and optionally, wherein the apparatus is configured to cause the AP to allocate the at least one TSN-enabled TWT SP according to one or more gate open times for the at least one STA in the TSN schedule.

Example 14 includes the subject matter of example 13, and optionally, wherein the apparatus is configured to cause the AP to allocate a start time of the at least one TSN-enabled TWT SP according to the one or more gate open times.

Example 15 includes the subject matter of any one of examples 1-14, and optionally, wherein the apparatus is configured to cause the AP to allocate the TSN-enabled TWT SP as a contention-based TSN-enabled TWT SP, during which transmission is to be performed according to a contention-based mechanism.

Example 16 includes the subject matter of any one of examples 1-14, and optionally, wherein the apparatus is configured to cause the AP to allocate the TSN-enabled TWT SP as a trigger-based TSN-enabled TWT SP, during which transmission is to be triggered by a trigger frame from the AP.

Example 17 includes the subject matter of any one of examples 1-16, and optionally, wherein the apparatus is configured to cause the AP to reschedule the at least one TSN-enabled TWT SP based on a change in one or more wireless channel conditions between the AP and the at least one STA.

Example 18 includes the subject matter of any one of examples 1-17, and optionally, comprising a radio.

Example 19 includes the subject matter of any one of examples 1-18, and optionally, comprising a memory, a processor and a network interface to communicate with one or more elements of a TSN network.

Example 20 includes a system of wireless communication comprising a wireless communication Access Point (AP), the AP comprising a network interface; a radio; a memory; a processor; and a controller configured to cause the AP to allocate at least one Time Sensitive Networking (TSN) enabled (TSN-enabled) Target Wakeup Time (TWT) Service Period (SP) based on one or more timing requirements of a TSN schedule of at least one TSN stream for at least one wireless communication station (STA); transmit a TWT scheduling message to schedule the TSN-enabled TWT SP, the TWT scheduling message comprising an indication that the TSN-enabled TWT SP is restricted to only TSN communications; and during the TSN-enabled TWT SP, communicate one or more frames of the at least one TSN stream with the at least one STA.

Example 21 includes the subject matter of example 20, and optionally, wherein the controller is configured to cause the AP to allocate a STA-specific TSN-enabled TWT SP to at least one specific STA, and to transmit a STA-specific TWT scheduling message to indicate that the STA-specific TSN-enabled TWT SP is restricted to communication of TSN frames of the at least one specific STA.

Example 22 includes the subject matter of example 21, and optionally, wherein the STA-specific TWT scheduling message comprises a TWT Identifier (ID) field to map the STA-specific TWT SP to a TSN stream, the TWT ID field comprising a value based on a User Priority (UP) field of the TSN stream.

Example 23 includes the subject matter of example 21 or 22, and optionally, wherein the controller is configured to cause the AP to negotiate a setup of one or more parameters of the STA-specific TSN-enabled TWT SP with the at least one specific STA.

Example 24 includes the subject matter of any one of examples 21-23, and optionally, wherein the controller is configured to cause the AP to process a first TWT setup frame from the specific STA and to transmit to the specific STA a second TWT setup frame, the first TWT setup frame comprising a TWT Identifier (ID) field comprising a TSN stream ID, the second TWT setup frame comprising the TWT scheduling message to schedule the TSN-enabled TWT SP for the TSN stream ID.

Example 25 includes the subject matter of any one of examples 21-23, and optionally, wherein the controller is configured to cause the AP to transmit to the specific STA an unsolicited TWT response frame comprising the TWT scheduling message to schedule the TSN-enabled TWT SP for a TSN stream Identifier (ID) of the specific STA.

Example 26 includes the subject matter of any one of examples 20-25, and optionally, wherein the controller is configured to cause the AP to allocate a broadcast TSN-enabled TWT SP, and to transmit a broadcast TWT scheduling message to indicate that the broadcast TSN-enabled TWT SP is restricted to communication of TSN frames.

Example 27 includes the subject matter of example 26, and optionally, wherein the controller is configured to cause the AP to transmit a beacon comprising a TWT element to allocate a broadcast TWT SP as the broadcast TSN-enabled TWT SP, the TWT element comprising a TWT flow identifier comprising a predefined TWT flow identifier value to indicate that frames transmitted during the broadcast TWT SP are restricted to TSN frames.

Example 28 includes the subject matter of example 27, and optionally, wherein the predefined TWT flow identifier value is 4.

Example 29 includes the subject matter of example 27 or 28, and optionally, wherein the TWT element comprises a control field and a Broadcast TWT information (info) subfield, the control field comprising a broadcast field value to indicate that the TWT SP is the broadcast TWT SP, the Broadcast TWT info subfield comprising a broadcast TWT Identifier (ID) field, the Broadcast TWT ID field comprising a value based on a TSN ID.

Example 30 includes the subject matter of any one of examples 20-29, and optionally, wherein the controller is configured to cause the AP to maintain a mapping between a TWT identifier (ID) of the TSN-enabled TWT SP and User Priority (UP) field of a scheduled TSN stream, which is scheduled to the TSN-enabled TWT SP.

Example 31 includes the subject matter of any one of examples 20-30, and optionally, wherein the TSN schedule comprises one or more transmission windows for the at least one TSN, the controller is configured to cause the AP to allocate the at least one TSN-enabled TWT SP based on the one or more transmission windows.

Example 32 includes the subject matter of any one of examples 20-31, and optionally, wherein the controller is configured to cause the AP to allocate the at least one TSN-enabled TWT SP according to one or more gate open times for the at least one STA in the TSN schedule.

Example 33 includes the subject matter of example 32, and optionally, wherein the controller is configured to cause the AP to allocate a start time of the at least one TSN-enabled TWT SP according to the one or more gate open times.

Example 34 includes the subject matter of any one of examples 20-33, and optionally, wherein the controller is configured to cause the AP to allocate the TSN-enabled TWT SP as a contention-based TSN-enabled TWT SP, during which transmission is to be performed according to a contention-based mechanism.

Example 35 includes the subject matter of any one of examples 20-33, and optionally, wherein the controller is configured to cause the AP to allocate the TSN-enabled TWT SP as a trigger-based TSN-enabled TWT SP, during which transmission is to be triggered by a trigger frame from the AP.

Example 36 includes the subject matter of any one of examples 20-35, and optionally, wherein the controller is configured to cause the AP to reschedule the at least one TSN-enabled TWT SP based on a change in one or more wireless channel conditions between the AP and the at least one STA.

Example 37 includes a method to be performed at a wireless communication Access Point (AP), the method comprising allocating at least one Time Sensitive Networking (TSN) enabled (TSN-enabled) Target Wakeup Time (TWT) Service Period (SP) based on one or more timing requirements of a TSN schedule of at least one TSN stream for at least one wireless communication station (STA); transmitting a TWT scheduling message to schedule the TSN-enabled TWT SP, the TWT scheduling message comprising an indication that the TSN-enabled TWT SP is restricted to only TSN communications; and during the TSN-enabled TWT SP, communicating one or more frames of the at least one TSN stream with the at least one STA.

Example 38 includes the subject matter of example 37, and optionally, comprising allocating a STA-specific TSN-enabled TWT SP to at least one specific STA, and transmitting a STA-specific TWT scheduling message to indicate that the STA-specific TSN-enabled TWT SP is restricted to communication of TSN frames of the at least one specific STA.

Example 39 includes the subject matter of example 38, and optionally, wherein the STA-specific TWT scheduling message comprises a TWT Identifier (ID) field to map the STA-specific TWT SP to a TSN stream, the TWT ID field comprising a value based on a User Priority (UP) field of the TSN stream.

Example 40 includes the subject matter of example 38 or 39, and optionally, comprising negotiating a setup of one or more parameters of the STA-specific TSN-enabled TWT SP with the at least one specific STA.

Example 41 includes the subject matter of any one of examples 38-40, and optionally, comprising processing a first TWT setup frame from the specific STA and transmitting to the specific STA a second TWT setup frame, the first TWT setup frame comprising a TWT Identifier (ID) field comprising a TSN stream ID, the second TWT setup frame comprising the TWT scheduling message to schedule the TSN-enabled TWT SP for the TSN stream ID.

Example 42 includes the subject matter of any one of examples 38-40, and optionally, comprising transmitting to the specific STA an unsolicited TWT response frame comprising the TWT scheduling message to schedule the TSN-enabled TWT SP for a TSN stream Identifier (ID) of the specific STA.

Example 43 includes the subject matter of any one of examples 37-42, and optionally, comprising allocating a broadcast TSN-enabled TWT SP, and transmitting a broadcast TWT scheduling message to indicate that the broadcast TSN-enabled TWT SP is restricted to communication of TSN frames.

Example 44 includes the subject matter of example 43, and optionally, comprising transmitting a beacon comprising a TWT element to allocate a broadcast TWT SP as the broadcast TSN-enabled TWT SP, the TWT element comprising a TWT flow identifier comprising a predefined TWT flow identifier value to indicate that frames transmitted during the broadcast TWT SP are restricted to TSN frames.

Example 45 includes the subject matter of example 44, and optionally, wherein the predefined TWT flow identifier value is 4.

Example 46 includes the subject matter of example 44 or 45, and optionally, wherein the TWT element comprises a control field and a Broadcast TWT information (info) subfield, the control field comprising a broadcast field value to indicate that the TWT SP is the broadcast TWT SP, the Broadcast TWT info subfield comprising a broadcast TWT Identifier (ID) field, the Broadcast TWT ID field comprising a value based on a TSN ID.

Example 47 includes the subject matter of any one of examples 37-46, and optionally, comprising maintaining a mapping between a TWT identifier (ID) of the TSN-enabled TWT SP and User Priority (UP) field of a scheduled TSN stream, which is scheduled to the TSN-enabled TWT SP.

Example 48 includes the subject matter of any one of examples 37-47, and optionally, wherein the TSN schedule comprises one or more transmission windows for the at least one TSN, the method comprising allocating the at least one TSN-enabled TWT SP based on the one or more transmission windows.

Example 49 includes the subject matter of any one of examples 37-48, and optionally, comprising allocating the at least one TSN-enabled TWT SP according to one or more gate open times for the at least one STA in the TSN schedule.

Example 50 includes the subject matter of example 49, and optionally, comprising allocating a start time of the at least one TSN-enabled TWT SP according to the one or more gate open times.

Example 51 includes the subject matter of any one of examples 37-50, and optionally, comprising allocating the TSN-enabled TWT SP as a contention-based TSN-enabled TWT SP, during which transmission is to be performed according to a contention-based mechanism.

Example 52 includes the subject matter of any one of examples 37-50, and optionally, comprising allocating the TSN-enabled TWT SP as a trigger-based TSN-enabled TWT SP, during which transmission is to be triggered by a trigger frame from the AP.

Example 53 includes the subject matter of any one of examples 37-52, and optionally, comprising rescheduling the at least one TSN-enabled TWT SP based on a change in one or more wireless channel conditions between the AP and the at least one STA.

Example 54 includes a product comprising one or more tangible computer-readable non-transitory storage media comprising computer-executable instructions operable to, when executed by at least one processor, enable the at least one processor to cause a wireless communication Access Point (AP) to allocate at least one Time Sensitive Networking (TSN) enabled (TSN-enabled) Target Wakeup Time (TWT) Service Period (SP) based on one or more timing requirements of a TSN schedule of at least one TSN stream for at least one wireless communication station (STA); transmit a TWT scheduling message to schedule the TSN-enabled TWT SP, the TWT scheduling message comprising an indication that the TSN-enabled TWT SP is restricted to only TSN communications; and during the TSN-enabled TWT SP, communicate one or more frames of the at least one TSN stream with the at least one STA.

Example 55 includes the subject matter of example 54, and optionally, wherein the instructions, when executed, cause the AP to allocate a STA-specific TSN-enabled TWT SP to at least one specific STA, and to transmit a STA-specific TWT scheduling message to indicate that the STA-specific TSN-enabled TWT SP is restricted to communication of TSN frames of the at least one specific STA.

Example 56 includes the subject matter of example 55, and optionally, wherein the STA-specific TWT scheduling message comprises a TWT Identifier (ID) field to map the STA-specific TWT SP to a TSN stream, the TWT ID field comprising a value based on a User Priority (UP) field of the TSN stream.

Example 57 includes the subject matter of example 55 or 56, and optionally, wherein the instructions, when executed, cause the AP to negotiate a setup of one or more parameters of the STA-specific TSN-enabled TWT SP with the at least one specific STA.

Example 58 includes the subject matter of any one of examples 55-57, and optionally, wherein the instructions, when executed, cause the AP to process a first TWT setup frame from the specific STA and to transmit to the specific STA a second TWT setup frame, the first TWT setup frame comprising a TWT Identifier (ID) field comprising a TSN stream ID, the second TWT setup frame comprising the TWT scheduling message to schedule the TSN-enabled TWT SP for the TSN stream ID.

Example 59 includes the subject matter of any one of examples 55-57, and optionally, wherein the instructions, when executed, cause the AP to transmit to the specific STA an unsolicited TWT response frame comprising the TWT scheduling message to schedule the TSN-enabled TWT SP for a TSN stream Identifier (ID) of the specific STA.

Example 60 includes the subject matter of any one of examples 54-59, and optionally, wherein the instructions, when executed, cause the AP to allocate a broadcast TSN-enabled TWT SP, and to transmit a broadcast TWT scheduling message to indicate that the broadcast TSN-enabled TWT SP is restricted to communication of TSN frames.

Example 61 includes the subject matter of example 60, and optionally, wherein the instructions, when executed, cause the AP to transmit a beacon comprising a TWT element to allocate a broadcast TWT SP as the broadcast TSN-enabled TWT SP, the TWT element comprising a TWT flow identifier comprising a predefined TWT flow identifier value to indicate that frames transmitted during the broadcast TWT SP are restricted to TSN frames.

Example 62 includes the subject matter of example 61, and optionally, wherein the predefined TWT flow identifier value is 4.

Example 63 includes the subject matter of example 61 or 62, and optionally, wherein the TWT element comprises a control field and a Broadcast TWT information (info) subfield, the control field comprising a broadcast field value to indicate that the TWT SP is the broadcast TWT SP, the Broadcast TWT info subfield comprising a broadcast TWT Identifier (ID) field, the Broadcast TWT ID field comprising a value based on a TSN ID.

Example 64 includes the subject matter of any one of examples 54-63, and optionally, wherein the instructions, when executed, cause the AP to maintain a mapping between a TWT identifier (ID) of the TSN-enabled TWT SP and User Priority (UP) field of a scheduled TSN stream, which is scheduled to the TSN-enabled TWT SP.

Example 65 includes the subject matter of any one of examples 54-64, and optionally, wherein the TSN schedule comprises one or more transmission windows for the at least one TSN, the instructions, when executed, cause the AP to allocate the at least one TSN-enabled TWT SP based on the one or more transmission windows.

Example 66 includes the subject matter of any one of examples 54-65, and optionally, wherein the instructions, when executed, cause the AP to allocate the at least one TSN-enabled TWT SP according to one or more gate open times for the at least one STA in the TSN schedule.

Example 67 includes the subject matter of example 66, and optionally, wherein the instructions, when executed, cause the AP to allocate a start time of the at least one TSN-enabled TWT SP according to the one or more gate open times.

Example 68 includes the subject matter of any one of examples 54-67, and optionally, wherein the instructions, when executed, cause the AP to allocate the TSN-enabled TWT SP as a contention-based TSN-enabled TWT SP, during which transmission is to be performed according to a contention-based mechanism.

Example 69 includes the subject matter of any one of examples 54-67, and optionally, wherein the instructions, when executed, cause the AP to allocate the TSN-enabled TWT SP as a trigger-based TSN-enabled TWT SP, during which transmission is to be triggered by a trigger frame from the AP.

Example 70 includes the subject matter of any one of examples 54-69, and optionally, wherein the instructions, when executed, cause the AP to reschedule the at least one TSN-enabled TWT SP based on a change in one or more wireless channel conditions between the AP and the at least one STA.

Example 71 includes an apparatus of wireless communication by a wireless communication Access Point (AP), the apparatus comprising means for allocating at least one Time Sensitive Networking (TSN) enabled (TSN-enabled) Target Wakeup Time (TWT) Service Period (SP) based on one or more timing requirements of a TSN schedule of at least one TSN stream for at least one wireless communication station (STA); means for transmitting a TWT scheduling message to schedule the TSN-enabled TWT SP, the TWT scheduling message comprising an indication that the TSN-enabled TWT SP is restricted to only TSN communications; and means for, during the TSN-enabled TWT SP, communicating one or more frames of the at least one TSN stream with the at least one STA.

Example 72 includes the subject matter of example 71, and optionally, comprising means for allocating a STA-specific TSN-enabled TWT SP to at least one specific STA, and transmitting a STA-specific TWT scheduling message to indicate that the STA-specific TSN-enabled TWT SP is restricted to communication of TSN frames of the at least one specific STA.

Example 73 includes the subject matter of example 72, and optionally, wherein the STA-specific TWT scheduling message comprises a TWT Identifier (ID) field to map the STA-specific TWT SP to a TSN stream, the TWT ID field comprising a value based on a User Priority (UP) field of the TSN stream.

Example 74 includes the subject matter of example 72 or 73, and optionally, comprising means for negotiating a setup of one or more parameters of the STA-specific TSN-enabled TWT SP with the at least one specific STA.

Example 75 includes the subject matter of any one of examples 72-74, and optionally, comprising means for processing a first TWT setup frame from the specific STA and transmitting to the specific STA a second TWT setup frame, the first TWT setup frame comprising a TWT Identifier (ID) field comprising a TSN stream ID, the second TWT setup frame comprising the TWT scheduling message to schedule the TSN-enabled TWT SP for the TSN stream ID.

Example 76 includes the subject matter of any one of examples 72-74, and optionally, comprising means for transmitting to the specific STA an unsolicited TWT response frame comprising the TWT scheduling message to schedule the TSN-enabled TWT SP for a TSN stream Identifier (ID) of the specific STA.

Example 77 includes the subject matter of any one of examples 71-76, and optionally, comprising means for allocating a broadcast TSN-enabled TWT SP, and transmitting a broadcast TWT scheduling message to indicate that the broadcast TSN-enabled TWT SP is restricted to communication of TSN frames.

Example 78 includes the subject matter of example 77, and optionally, comprising means for transmitting a beacon comprising a TWT element to allocate a broadcast TWT SP as the broadcast TSN-enabled TWT SP, the TWT element comprising a TWT flow identifier comprising a predefined TWT flow identifier value to indicate that frames transmitted during the broadcast TWT SP are restricted to TSN frames.

Example 79 includes the subject matter of example 78, and optionally, wherein the predefined TWT flow identifier value is 4.

Example 80 includes the subject matter of example 78 or 79, and optionally, wherein the TWT element comprises a control field and a Broadcast TWT information (info) subfield, the control field comprising a broadcast field value to indicate that the TWT SP is the broadcast TWT SP, the Broadcast TWT info subfield comprising a broadcast TWT Identifier (ID) field, the Broadcast TWT ID field comprising a value based on a TSN ID.

Example 81 includes the subject matter of any one of examples 71-80, and optionally, comprising means for maintaining a mapping between a TWT identifier (ID) of the TSN-enabled TWT SP and User Priority (UP) field of a scheduled TSN stream, which is scheduled to the TSN-enabled TWT SP.

Example 82 includes the subject matter of any one of examples 71-81, and optionally, wherein the TSN schedule comprises one or more transmission windows for the at least one TSN, the apparatus comprising means for allocating the at least one TSN-enabled TWT SP based on the one or more transmission windows.

Example 83 includes the subject matter of any one of examples 71-82, and optionally, comprising means for allocating the at least one TSN-enabled TWT SP according to one or more gate open times for the at least one STA in the TSN schedule.

Example 84 includes the subject matter of example 83, and optionally, comprising means for allocating a start time of the at least one TSN-enabled TWT SP according to the one or more gate open times.

Example 85 includes the subject matter of any one of examples 71-84, and optionally, comprising means for allocating the TSN-enabled TWT SP as a contention-based TSN-enabled TWT SP, during which transmission is to be performed according to a contention-based mechanism.

Example 86 includes the subject matter of any one of examples 71-84, and optionally, comprising means for allocating the TSN-enabled TWT SP as a trigger-based TSN-enabled TWT SP, during which transmission is to be triggered by a trigger frame from the AP.

Example 87 includes the subject matter of any one of examples 71-86, and optionally, comprising means for rescheduling the at least one TSN-enabled TWT SP based on a change in one or more wireless channel conditions between the AP and the at least one STA.

Example 88 includes an apparatus comprising logic and circuitry configured to cause a wireless communication station (STA) to receive from an Access Point (AP) a Target Wakeup Time (TWT) scheduling message to schedule at least one Time Sensitive Networking (TSN) enabled (TSN-enabled) TWT Service Period (SP), the message comprising an indication that the TSN-enabled TWT SP is restricted to only TSN communications, the TSN-enabled TWT SP is based on one or more timing requirements of a TSN schedule of at least one TSN stream for the STA; and during the TSN-enabled TWT SP, communicate one or more frames of the at least one TSN stream with the AP.

Example 89 includes the subject matter of example 88, and optionally, wherein the apparatus is configured to cause the STA to process a STA-specific TWT scheduling message from the AP to indicate that the STA-specific TSN-enabled TWT SP is restricted to communication of TSN frames of at least one specific STA, the at least one specific STA comprising the STA.

Example 90 includes the subject matter of example 89, and optionally, wherein the STA-specific TWT scheduling message comprises a TWT Identifier (ID) field to map the STA-specific TWT SP to the TSN stream for the STA, the TWT ID field comprising a value based on a User Priority (UP) field of the TSN stream for the STA.

Example 91 includes the subject matter of example 89 or 90, and optionally, wherein the apparatus is configured to cause the STA to negotiate a setup of one or more parameters of the STA-specific TSN-enabled TWT SP with the AP.

Example 92 includes the subject matter of any one of examples 89-91, and optionally, wherein the apparatus is configured to cause the STA to transmit a first TWT setup frame to the AP and to receive from the AP a second TWT setup frame, the first TWT setup frame comprising a TWT Identifier (ID) field comprising a TSN stream ID, the second TWT setup frame comprising the TWT scheduling message to schedule the TSN-enabled TWT SP for the TSN stream ID.

Example 93 includes the subject matter of any one of examples 89-91, and optionally, wherein the apparatus is configured to cause the STA to receive from the AP an unsolicited TWT response frame comprising the TWT scheduling message to schedule the TSN-enabled TWT SP for a TSN stream Identifier (ID) of the at least one specific STA.

Example 94 includes the subject matter of any one of examples 88-93, and optionally, wherein the apparatus is configured to cause the STA to process a broadcast TWT scheduling message from the AP to indicate that the TSN-enabled TWT SP is allocated as a broadcast TSN-enabled TWT SP restricted to communication of TSN frames.

Example 95 includes the subject matter of example 94, and optionally, wherein the apparatus is configured to cause the STA to process a beacon from the AP comprising a TWT element to allocate a broadcast TWT SP as the broadcast TSN-enabled TWT SP, the TWT element comprising a TWT flow identifier comprising a predefined TWT flow identifier value to indicate that frames transmitted during the broadcast TWT SP are restricted to TSN frames.

Example 96 includes the subject matter of example 95, and optionally, wherein the predefined TWT flow identifier value is 4.

Example 97 includes the subject matter of example 95 or 96, and optionally, wherein the TWT element comprises a control field and a Broadcast TWT information (info) subfield, the control field comprising a broadcast field value to indicate that the TWT SP is the broadcast TWT SP, the Broadcast TWT info subfield comprising a broadcast TWT Identifier (ID) field, the Broadcast TWT ID field comprising a value based on a TSN ID.

Example 98 includes the subject matter of any one of examples 88-97, and optionally, wherein the apparatus is configured to cause the STA to maintain a mapping between a TWT identifier (ID) of the TSN-enabled TWT SP and User Priority (UP) field of a scheduled TSN stream, which is scheduled to the TSN-enabled TWT SP.

Example 99 includes the subject matter of any one of examples 88-98, and optionally, wherein the TSN schedule comprises one or more transmission windows for the at least one TSN, at least one TSN-enabled TWT SP is based on the one or more transmission windows.

Example 100 includes the subject matter of any one of examples 88-99, and optionally, wherein the at least one TSN-enabled TWT SP is according to one or more gate open times for the STA in the TSN schedule.

Example 101 includes the subject matter of example 100, and optionally, wherein a start time of the at least one TSN-enabled TWT SP is according to the one or more gate open times.

Example 102 includes the subject matter of any one of examples 88-101, and optionally, wherein the TSN-enabled TWT SP comprises a contention-based TSN-enabled TWT SP, during which transmission is to be performed according to a contention-based mechanism.

Example 103 includes the subject matter of any one of examples 88-101, and optionally, wherein the TSN-enabled TWT SP comprises a trigger-based TSN-enabled TWT SP, during which transmission from the STA is to be triggered by a trigger frame from the AP.

Example 104 includes the subject matter of any one of examples 88-103, and optionally, comprising a radio.

Example 105 includes the subject matter of any one of examples 88-104, and optionally, comprising a memory, a processor, and one or more antennas.

Example 106 includes a system of wireless communication comprising a wireless communication station (STA), the STA comprising one or more antennas; a radio; a memory; a processor; and a controller configured to cause the STA to receive from an Access Point (AP) a Target Wakeup Time (TWT) scheduling message to schedule at least one Time Sensitive Networking (TSN) enabled (TSN-enabled) TWT Service Period (SP), the message comprising an indication that the TSN-enabled TWT SP is restricted to only TSN communications, the TSN-enabled TWT SP is based on one or more timing requirements of a TSN schedule of at least one TSN stream for the STA; and during the TSN-enabled TWT SP, communicate one or more frames of the at least one TSN stream with the AP.

Example 107 includes the subject matter of example 106, and optionally, wherein the controller is configured to cause the STA to process a STA-specific TWT scheduling message from the AP to indicate that the STA-specific TSN-enabled TWT SP is restricted to communication of TSN frames of at least one specific STA, the at least one specific STA comprising the STA.

Example 108 includes the subject matter of example 107, and optionally, wherein the STA-specific TWT scheduling message comprises a TWT Identifier (ID) field to map the STA-specific TWT SP to the TSN stream for the STA, the TWT ID field comprising a value based on a User Priority (UP) field of the TSN stream for the STA.

Example 109 includes the subject matter of example 107 or 108, and optionally, wherein the controller is configured to cause the STA to negotiate a setup of one or more parameters of the STA-specific TSN-enabled TWT SP with the AP.

Example 110 includes the subject matter of any one of examples 107-109, and optionally, wherein the controller is configured to cause the STA to transmit a first TWT setup frame to the AP and to receive from the AP a second TWT setup frame, the first TWT setup frame comprising a TWT Identifier (ID) field comprising a TSN stream ID, the second TWT setup frame comprising the TWT scheduling message to schedule the TSN-enabled TWT SP for the TSN stream ID.

Example 111 includes the subject matter of any one of examples 107-109, and optionally, wherein the controller is configured to cause the STA to receive from the AP an unsolicited TWT response frame comprising the TWT scheduling message to schedule the TSN-enabled TWT SP for a TSN stream Identifier (ID) of the at least one specific STA.

Example 112 includes the subject matter of any one of examples 106-111, and optionally, wherein the controller is configured to cause the STA to process a broadcast TWT scheduling message from the AP to indicate that the TSN-enabled TWT SP is allocated as a broadcast TSN-enabled TWT SP restricted to communication of TSN frames.

Example 113 includes the subject matter of example 112, and optionally, wherein the controller is configured to cause the STA to process a beacon from the AP comprising a TWT element to allocate a broadcast TWT SP as the broadcast TSN-enabled TWT SP, the TWT element comprising a TWT flow identifier comprising a predefined TWT flow identifier value to indicate that frames transmitted during the broadcast TWT SP are restricted to TSN frames.

Example 114 includes the subject matter of example 113, and optionally, wherein the predefined TWT flow identifier value is 4.

Example 115 includes the subject matter of example 113 or 114, and optionally, wherein the TWT element comprises a control field and a Broadcast TWT information (info) subfield, the control field comprising a broadcast field value to indicate that the TWT SP is the broadcast TWT SP, the Broadcast TWT info subfield comprising a broadcast TWT Identifier (ID) field, the Broadcast TWT ID field comprising a value based on a TSN ID.

Example 116 includes the subject matter of any one of examples 106-115, and optionally, wherein the controller is configured to cause the STA to maintain a mapping between a TWT identifier (ID) of the TSN-enabled TWT SP and User Priority (UP) field of a scheduled TSN stream, which is scheduled to the TSN-enabled TWT SP.

Example 117 includes the subject matter of any one of examples 106-116, and optionally, wherein the TSN schedule comprises one or more transmission windows for the at least one TSN, at least one TSN-enabled TWT SP is based on the one or more transmission windows.

Example 118 includes the subject matter of any one of examples 106-117, and optionally, wherein the at least one TSN-enabled TWT SP is according to one or more gate open times for the STA in the TSN schedule.

Example 119 includes the subject matter of example 118, and optionally, wherein a start time of the at least one TSN-enabled TWT SP is according to the one or more gate open times.

Example 120 includes the subject matter of any one of examples 106-119, and optionally, wherein the TSN-enabled TWT SP comprises a contention-based TSN-enabled TWT SP, during which transmission is to be performed according to a contention-based mechanism.

Example 121 includes the subject matter of any one of examples 106-120, and optionally, wherein the TSN-enabled TWT SP comprises a trigger-based TSN-enabled TWT SP, during which transmission from the STA is to be triggered by a trigger frame from the AP.

Example 122 includes a method to be performed at a wireless communication station (STA), the method comprising receiving from an Access Point (AP) a Target Wakeup Time (TWT) scheduling message to schedule at least one Time Sensitive Networking (TSN) enabled (TSN-enabled) TWT Service Period (SP), the message comprising an indication that the TSN-enabled TWT SP is restricted to only TSN communications, the TSN-enabled TWT SP is based on one or more timing requirements of a TSN schedule of at least one TSN stream for the STA; and during the TSN-enabled TWT SP, communicating one or more frames of the at least one TSN stream with the AP.

Example 123 includes the subject matter of example 122, and optionally, comprising processing a STA-specific TWT scheduling message from the AP to indicate that the STA-specific TSN-enabled TWT SP is restricted to communication of TSN frames of at least one specific STA, the at least one specific STA comprising the STA.

Example 124 includes the subject matter of example 123, and optionally, wherein the STA-specific TWT scheduling message comprises a TWT Identifier (ID) field to map the STA-specific TWT SP to the TSN stream for the STA, the TWT ID field comprising a value based on a User Priority (UP) field of the TSN stream for the STA.

Example 125 includes the subject matter of example 123 or 124, and optionally, comprising negotiating a setup of one or more parameters of the STA-specific TSN-enabled TWT SP with the AP.

Example 126 includes the subject matter of any one of examples 123-125, and optionally, comprising transmitting a first TWT setup frame to the AP and receiving from the AP a second TWT setup frame, the first TWT setup frame comprising a TWT Identifier (ID) field comprising a TSN stream ID, the second TWT setup frame comprising the TWT scheduling message to schedule the TSN-enabled TWT SP for the TSN stream ID.

Example 127 includes the subject matter of any one of examples 123-125, and optionally, comprising receiving from the AP an unsolicited TWT response frame comprising the TWT scheduling message to schedule the TSN-enabled TWT SP for a TSN stream Identifier (ID) of the at least one specific STA.

Example 128 includes the subject matter of any one of examples 122-127, and optionally, comprising processing a broadcast TWT scheduling message from the AP to indicate that the TSN-enabled TWT SP is allocated as a broadcast TSN-enabled TWT SP restricted to communication of TSN frames.

Example 129 includes the subject matter of example 128, and optionally, comprising processing a beacon from the AP comprising a TWT element to allocate a broadcast TWT SP as the broadcast TSN-enabled TWT SP, the TWT element comprising a TWT flow identifier comprising a predefined TWT flow identifier value to indicate that frames transmitted during the broadcast TWT SP are restricted to TSN frames.

Example 130 includes the subject matter of example 129, and optionally, wherein the predefined TWT flow identifier value is 4.

Example 131 includes the subject matter of example 129 or 130, and optionally, wherein the TWT element comprises a control field and a Broadcast TWT information (info) subfield, the control field comprising a broadcast field value to indicate that the TWT SP is the broadcast TWT SP, the Broadcast TWT info subfield comprising a broadcast TWT Identifier (ID) field, the Broadcast TWT ID field comprising a value based on a TSN ID.

Example 132 includes the subject matter of any one of examples 122-131, and optionally, comprising maintaining a mapping between a TWT identifier (ID) of the TSN-enabled TWT SP and User Priority (UP) field of a scheduled TSN stream, which is scheduled to the TSN-enabled TWT SP.

Example 133 includes the subject matter of any one of examples 122-132, and optionally, wherein the TSN schedule comprises one or more transmission windows for the at least one TSN, at least one TSN-enabled TWT SP is based on the one or more transmission windows.

Example 134 includes the subject matter of any one of examples 122-133, and optionally, wherein the at least one TSN-enabled TWT SP is according to one or more gate open times for the STA in the TSN schedule.

Example 135 includes the subject matter of example 134, and optionally, wherein a start time of the at least one TSN-enabled TWT SP is according to the one or more gate open times.

Example 136 includes the subject matter of any one of examples 122-135, and optionally, wherein the TSN-enabled TWT SP comprises a contention-based TSN-enabled TWT SP, during which transmission is to be performed according to a contention-based mechanism.

Example 137 includes the subject matter of any one of examples 122-135, and optionally, wherein the TSN-enabled TWT SP comprises a trigger-based TSN-enabled TWT SP, during which transmission from the STA is to be triggered by a trigger frame from the AP.

Example 138 includes a product comprising one or more tangible computer-readable non-transitory storage media comprising computer-executable instructions operable to, when executed by at least one processor, enable the at least one processor to cause a wireless communication station (STA) to receive from an Access Point (AP) a Target Wakeup Time (TWT) scheduling message to schedule at least one Time Sensitive Networking (TSN) enabled (TSN-enabled) TWT Service Period (SP), the message comprising an indication that the TSN-enabled TWT SP is restricted to only TSN communications, the TSN-enabled TWT SP is based on one or more timing requirements of a TSN schedule of at least one TSN stream for the STA; and during the TSN-enabled TWT SP, communicate one or more frames of the at least one TSN stream with the AP.

Example 139 includes the subject matter of example 138, and optionally, wherein the instructions, when executed, cause the STA to process a STA-specific TWT scheduling message from the AP to indicate that the STA-specific TSN-enabled TWT SP is restricted to communication of TSN frames of at least one specific STA, the at least one specific STA comprising the STA.

Example 140 includes the subject matter of example 139, and optionally, wherein the STA-specific TWT scheduling message comprises a TWT Identifier (ID) field to map the STA-specific TWT SP to the TSN stream for the STA, the TWT ID field comprising a value based on a User Priority (UP) field of the TSN stream for the STA.

Example 141 includes the subject matter of example 139 or 140, and optionally, wherein the instructions, when executed, cause the STA to negotiate a setup of one or more parameters of the STA-specific TSN-enabled TWT SP with the AP.

Example 142 includes the subject matter of any one of examples 139-141, and optionally, wherein the instructions, when executed, cause the STA to transmit a first TWT setup frame to the AP and to receive from the AP a second TWT setup frame, the first TWT setup frame comprising a TWT Identifier (ID) field comprising a TSN stream ID, the second TWT setup frame comprising the TWT scheduling message to schedule the TSN-enabled TWT SP for the TSN stream ID.

Example 143 includes the subject matter of any one of examples 139-141, and optionally, wherein the instructions, when executed, cause the STA to receive from the AP an unsolicited TWT response frame comprising the TWT scheduling message to schedule the TSN-enabled TWT SP for a TSN stream Identifier (ID) of the at least one specific STA.

Example 144 includes the subject matter of any one of examples 138-143, and optionally, wherein the instructions, when executed, cause the STA to process a broadcast TWT scheduling message from the AP to indicate that the TSN-enabled TWT SP is allocated as a broadcast TSN-enabled TWT SP restricted to communication of TSN frames.

Example 145 includes the subject matter of example 144, and optionally, wherein the instructions, when executed, cause the STA to process a beacon from the AP comprising a TWT element to allocate a broadcast TWT SP as the broadcast TSN-enabled TWT SP, the TWT element comprising a TWT flow identifier comprising a predefined TWT flow identifier value to indicate that frames transmitted during the broadcast TWT SP are restricted to TSN frames.

Example 146 includes the subject matter of example 145, and optionally, wherein the predefined TWT flow identifier value is 4.

Example 147 includes the subject matter of example 145 or 146, and optionally, wherein the TWT element comprises a control field and a Broadcast TWT information (info) subfield, the control field comprising a broadcast field value to indicate that the TWT SP is the broadcast TWT SP, the Broadcast TWT info subfield comprising a broadcast TWT Identifier (ID) field, the Broadcast TWT ID field comprising a value based on a TSN ID.

Example 148 includes the subject matter of any one of examples 138-147, and optionally, wherein the instructions, when executed, cause the STA to maintain a mapping between a TWT identifier (ID) of the TSN-enabled TWT SP and User Priority (UP) field of a scheduled TSN stream, which is scheduled to the TSN-enabled TWT SP.

Example 149 includes the subject matter of any one of examples 138-148, and optionally, wherein the TSN schedule comprises one or more transmission windows for the at least one TSN, at least one TSN-enabled TWT SP is based on the one or more transmission windows.

Example 150 includes the subject matter of any one of examples 138-149, and optionally, wherein the at least one TSN-enabled TWT SP is according to one or more gate open times for the STA in the TSN schedule.

Example 151 includes the subject matter of example 150, and optionally, wherein a start time of the at least one TSN-enabled TWT SP is according to the one or more gate open times.

Example 152 includes the subject matter of any one of examples 138-151, and optionally, wherein the TSN-enabled TWT SP comprises a contention-based TSN-enabled TWT SP, during which transmission is to be performed according to a contention-based mechanism.

Example 153 includes the subject matter of any one of examples 138-152, and optionally, wherein the TSN-enabled TWT SP comprises a trigger-based TSN-enabled TWT SP, during which transmission from the STA is to be triggered by a trigger frame from the AP.

Example 154 includes an apparatus of wireless communication by a wireless communication station (STA), the apparatus comprising means for receiving from an Access Point (AP) a Target Wakeup Time (TWT) scheduling message to schedule at least one Time Sensitive Networking (TSN) enabled (TSN-enabled) TWT Service Period (SP), the message comprising an indication that the TSN-enabled TWT SP is restricted to only TSN communications, the TSN-enabled TWT SP is based on one or more timing requirements of a TSN schedule of at least one TSN stream for the STA; and means for, during the TSN-enabled TWT SP, communicating one or more frames of the at least one TSN stream with the AP.

Example 155 includes the subject matter of example 154, and optionally, comprising means for processing a STA-specific TWT scheduling message from the AP to indicate that the STA-specific TSN-enabled TWT SP is restricted to communication of TSN frames of at least one specific STA, the at least one specific STA comprising the STA.

Example 156 includes the subject matter of example 155, and optionally, wherein the STA-specific TWT scheduling message comprises a TWT Identifier (ID) field to map the STA-specific TWT SP to the TSN stream for the STA, the TWT ID field comprising a value based on a User Priority (UP) field of the TSN stream for the STA.

Example 157 includes the subject matter of example 155 or 156, and optionally, comprising means for negotiating a setup of one or more parameters of the STA-specific TSN-enabled TWT SP with the AP.

Example 158 includes the subject matter of any one of examples 155-157, and optionally, comprising means for transmitting a first TWT setup frame to the AP and receiving from the AP a second TWT setup frame, the first TWT setup frame comprising a TWT Identifier (ID) field comprising a TSN stream ID, the second TWT setup frame comprising the TWT scheduling message to schedule the TSN-enabled TWT SP for the TSN stream ID.

Example 159 includes the subject matter of any one of examples 155-157, and optionally, comprising means for receiving from the AP an unsolicited TWT response frame comprising the TWT scheduling message to schedule the TSN-enabled TWT SP for a TSN stream Identifier (ID) of the at least one specific STA.

Example 160 includes the subject matter of any one of examples 154-159, and optionally, comprising means for processing a broadcast TWT scheduling message from the AP to indicate that the TSN-enabled TWT SP is allocated as a broadcast TSN-enabled TWT SP restricted to communication of TSN frames.

Example 161 includes the subject matter of example 160, and optionally, comprising means for processing a beacon from the AP comprising a TWT element to allocate a broadcast TWT SP as the broadcast TSN-enabled TWT SP, the TWT element comprising a TWT flow identifier comprising a predefined TWT flow identifier value to indicate that frames transmitted during the broadcast TWT SP are restricted to TSN frames.

Example 162 includes the subject matter of example 161, and optionally, wherein the predefined TWT flow identifier value is 4.

Example 163 includes the subject matter of example 161 or 162, and optionally, wherein the TWT element comprises a control field and a Broadcast TWT information (info) subfield, the control field comprising a broadcast field value to indicate that the TWT SP is the broadcast TWT SP, the Broadcast TWT info subfield comprising a broadcast TWT Identifier (ID) field, the Broadcast TWT ID field comprising a value based on a TSN ID.

Example 164 includes the subject matter of any one of examples 154-163, and optionally, comprising means for maintaining a mapping between a TWT identifier (ID) of the TSN-enabled TWT SP and User Priority (UP) field of a scheduled TSN stream, which is scheduled to the TSN-enabled TWT SP.

Example 165 includes the subject matter of any one of examples 154-164, and optionally, wherein the TSN schedule comprises one or more transmission windows for the at least one TSN, at least one TSN-enabled TWT SP is based on the one or more transmission windows.

Example 166 includes the subject matter of any one of examples 154-165, and optionally, wherein the at least one TSN-enabled TWT SP is according to one or more gate open times for the STA in the TSN schedule.

Example 167 includes the subject matter of example 166, and optionally, wherein a start time of the at least one TSN-enabled TWT SP is according to the one or more gate open times.

Example 168 includes the subject matter of any one of examples 154-167, and optionally, wherein the TSN-enabled TWT SP comprises a contention-based TSN-enabled TWT SP, during which transmission is to be performed according to a contention-based mechanism.

Example 169 includes the subject matter of any one of examples 154-167, and optionally, wherein the TSN-enabled TWT SP comprises a trigger-based TSN-enabled TWT SP, during which transmission from the STA is to be triggered by a trigger frame from the AP.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless communication Access Point (AP) to:
   allocate at least one Time Sensitive Networking (TSN) enabled (TSN-enabled) Target Wakeup Time (TWT) Service Period (SP) based on one or more timing requirements of a TSN schedule of at least one TSN stream for at least one wireless communication station (STA), wherein allocating the at least one TSN-enabled TWT SP comprises allocating a STA-specific TSN-enabled TWT SP to at least one specific STA;
   transmit a TWT scheduling message to schedule the TSN-enabled TWT SP, the TWT scheduling message comprising an indication that the TSN-enabled TWT SP is restricted to only TSN communications, wherein the TWT scheduling message comprises a STA-specific TWT scheduling message to indicate that the STA-specific TSN-enabled TWT SP is restricted to communication of TSN frames of the at least one specific STA, wherein the STA-specific TWT scheduling message comprises an Identifier (ID) field comprising a value based on a User Priority (UP) field of a TSN stream mapped to the STA-specific TSN-enabled TWT SP; and during the TSN-enabled TWT SP, communicate one or more frames of the at least one TSN stream with the at least one STA.

2. The apparatus of claim 1 configured to cause the AP to negotiate a setup of one or more parameters of the STA-specific TSN-enabled TWT SP with the at least one specific STA.

3. The apparatus of claim 1 configured to cause the AP to process a first TWT setup frame from the specific STA and to transmit to the specific STA a second TWT setup frame, wherein an ID field of the first TWT setup frame comprises a TSN stream ID, wherein the second TWT setup frame comprises the STA-specific TWT scheduling message to schedule the STA-specific TSN-enabled TWT SP for the TSN stream ID.

4. The apparatus of claim 1 configured to cause the AP to transmit to the specific STA an unsolicited TWT response frame comprising the STA-specific TWT scheduling message to schedule the STA-specific TSN-enabled TWT SP for a TSN stream ID of the specific STA.

5. The apparatus of claim 1 configured to cause the AP to allocate a broadcast TSN-enabled TWT SP, and to transmit a broadcast TWT scheduling message to indicate that the broadcast TSN-enabled TWT SP is restricted to communication of TSN frames.

6. The apparatus of claim 5 configured to cause the AP to transmit a beacon comprising a TWT element to allocate a broadcast TWT SP as the broadcast TSN-enabled TWT SP, the TWT element comprising a TWT flow identifier comprising a predefined TWT flow identifier value to indicate that frames transmitted during the broadcast TWT SP are restricted to TSN frames.

7. The apparatus of claim 6, wherein the predefined TWT flow identifier value is 4.

8. The apparatus of claim 6, wherein the TWT element comprises a control field and a Broadcast TWT information (info) subfield, the control field comprising a broadcast field value to indicate the broadcast TWT SP, the Broadcast TWT info subfield comprising a broadcast TWT Identifier (ID) ID field, the Broadcast TWT ID field comprising a value based on a TSN ID.

9. The apparatus of claim 1 configured to cause the AP to maintain a mapping between an ID of the TSN-enabled TWT SP and the UP field of the TSN stream.

10. The apparatus of claim 1, wherein the TSN schedule comprises one or more transmission windows for the at least one TSN stream, the apparatus configured to cause the AP to allocate the at least one TSN-enabled TWT SP based on the one or more transmission windows.

11. The apparatus of claim 1 configured to cause the AP to allocate the at least one TSN-enabled TWT SP according to one or more gate open times for the at least one STA in the TSN schedule.

12. The apparatus of claim 1 configured to cause the AP to allocate the at least one TSN-enabled TWT SP as a contention-based TSN-enabled TWT SP, during which transmission is to be performed according to a contention-based mechanism.

13. The apparatus of claim 1 configured to cause the AP to allocate the at least one TSN-enabled TWT SP as a trigger-based TSN-enabled TWT SP, during which transmission is to be triggered by a trigger frame from the AP.

14. The apparatus of claim 1 configured to cause the AP to reschedule the at least one TSN-enabled TWT SP based on a change in one or more wireless channel conditions between the AP and the at least one STA.

15. The apparatus of claim 1 comprising a memory, a processor and a network interface to communicate with one or more elements of a TSN network.

16. A product comprising one or more tangible computer-readable non-transitory storage media comprising computer-executable instructions operable to, when executed by at least one processor, enable the at least one processor to cause a wireless communication Access Point (AP) to:

allocate at least one Time Sensitive Networking (TSN) enabled (TSN-enabled) Target Wakeup Time (TWT) Service Period (SP) based on one or more timing requirements of a TSN schedule of at least one TSN stream for at least one wireless communication station (STA), wherein allocating the at least one TSN-enabled TWT SP comprises allocating a STA-specific TSN-enabled TWT SP to at least one specific STA;

transmit a TWT scheduling message to schedule the TSN-enabled TWT SP, the TWT scheduling message comprising an indication that the TSN-enabled TWT SP is restricted to only TSN communications, wherein the TWT scheduling message comprises a STA-specific TWT scheduling message to indicate that the STA-specific TSN-enabled TWT SP is restricted to communication of TSN frames of the at least one specific STA, wherein the STA-specific TWT scheduling message comprises an Identifier (ID) field comprising a value based on a User Priority (UP) field of a TSN stream mapped to the STA-specific TSN-enabled TWT SP; and during the TSN-enabled TWT SP, communicate one or more frames of the at least one TSN stream with the at least one STA.

17. The product of claim 16, wherein the TSN schedule comprises one or more transmission windows for the at least one TSN stream, the instructions, when executed, cause the AP to allocate the at least one TSN-enabled TWT SP based on the one or more transmission windows.

18. An apparatus comprising logic and circuitry configured to cause a wireless communication station (STA) to:

receive from an Access Point (AP) a Target Wakeup Time (TWT) scheduling message to schedule at least one Time Sensitive Networking (TSN) enabled (TSN-enabled) TWT Service Period (SP), the TWT scheduling message comprising an indication that the TSN-enabled TWT SP is restricted to only TSN communications, the TSN-enabled TWT SP is based on one or more timing requirements of a TSN schedule of at least one TSN stream for the STA, wherein the TWT scheduling message comprises a STA-specific TWT scheduling message to indicate a STA-specific TSN-enabled TWT SP restricted to communication of TSN frames of at least one specific STA, the at least one specific STA comprising said STA, wherein the STA-specific TWT scheduling message comprises an Identifier (ID) field comprising a value based on a User Priority (UP) field of a TSN stream mapped to the STA-specific TSN-enabled TWT SP; and during the TSN-enabled TWT SP, communicate one or more frames of the at least one TSN stream with the AP.

19. The apparatus of claim 18 configured to cause the STA to negotiate a setup of one or more parameters of the STA-specific TSN-enabled TWT SP with the AP.

20. The apparatus of claim 18 configured to cause the STA to process a broadcast TWT scheduling message from the AP to indicate allocation of a broadcast TSN-enabled TWT SP restricted to communication of TSN frames.

21. The apparatus of claim 18, wherein the TSN schedule comprises one or more transmission windows for the at least one TSN stream, the at least one TSN-enabled TWT SP is based on the one or more transmission windows.

22. A product comprising one or more tangible computer-readable non-transitory storage media comprising computer-executable instructions operable to, when executed by at least one processor, enable the at least one processor to cause a wireless communication station (STA) to:

receive from an Access Point (AP) a Target Wakeup Time (TWT) scheduling message to schedule at least one Time Sensitive Networking (TSN) enabled (TSN-enabled) TWT Service Period (SP), the TWT scheduling message comprising an indication that the TSN-enabled TWT SP is restricted to only TSN communications, the TSN-enabled TWT SP is based on one or more timing requirements of a TSN schedule of at least one TSN stream for the STA, wherein the TWT scheduling message comprises a STA-specific TWT scheduling message to indicate a STA-specific TSN-enabled TWT SP restricted to communication of TSN frames of at least one specific STA, the at least one specific STA comprising said STA, wherein the STA-specific TWT scheduling message comprises an Identifier (ID) field comprising a value based on a User Priority (UP) field of a TSN stream mapped to the STA-specific TSN-enabled TWT SP; and during the TSN-enabled TWT SP, communicate one or more frames of the at least one TSN stream with the AP.

23. The product of claim 22 configured to cause the STA to negotiate a setup of one or more parameters of the STA-specific TSN-enabled TWT SP with the AP.

\* \* \* \* \*